United States Patent [19]

Purland et al.

[11] 3,878,915

[45] Apr. 22, 1975

[54] ELECTRONIC MOTOR VEHICLE SPEED CONTROL APPARATUS

[75] Inventors: Donald A. Purland, New Hope; Alan M. Gustafson, Minneapolis, both of Minn.

[73] Assignee: Digi-Gard, Inc., New Hope, Minn.

[22] Filed: Aug. 24, 1973

[21] Appl. No.: 391,460

[52] U.S. Cl. .......................... 180/105 E; 180/105 R
[51] Int. Cl. ............................................ B60r 25/04
[58] Field of Search ...... 180/105 R, 105 E, 99, 114; 317/134; 307/10

[56] References Cited
UNITED STATES PATENTS

| | | | |
|---|---|---|---|
| 2,773,993 | 12/1956 | Rush | 180/105 R |
| 3,581,839 | 6/1971 | Carp | 180/105 E |
| 3,610,943 | 10/1971 | Jones | 317/134 |
| 3,634,880 | 1/1972 | Hawkins | 317/134 |
| 3,710,316 | 1/1973 | Kromer | 307/10 AT |
| 3,718,202 | 2/1973 | Brock | 180/114 |
| 3,722,614 | 3/1973 | Sakakibara et al. | 180/105 E |
| 3,755,776 | 8/1973 | Kotras | 180/99 |
| 3,766,522 | 10/1973 | Marsh | 317/134 |

*Primary Examiner*—M. Henson Wood, Jr.
*Assistant Examiner*—Reinhard J. Eisenzopf

[57] ABSTRACT

A programmable speed control apparatus for limiting the maximum speed of a motor vehicle to one of a plurality of predetermined velocities as selected by operator entered input codes. The speed control apparatus is programmable to operatively respond only to unique operator identified input codes which may be confidentially issued by insurance companies to drivers of a motor vehicle according to their age, insurance risk, or the like. An input section accepts and decodes operator entered input codes. A programmable section, normally inaccessible to an operator of the vehicle, enables decoding circuits to permit energization of the vehicle's engine and to select a predetermined maximum speed limit for the vehicle in response to the unique input codes when entered in a timely manner. A speed sensor produces a speed signal proportional to the actual velocity of the vehicle. A control unit compares the speed signal against a reference signal determined by the selected predetermined maximum speed limit and stops the vehicle's engine whenever the actual speed exceeds the selected speed of the vehicle. A control override feature allows an operator to exceed his predetermined maximum speed in emergency passing situations. Once a unique operator input code has been accepted by the system, subsequent recognition of another unique input code is prevented until the apparatus is recycled. An acceleration control prevents acceleration of the vehicle above a predetermined acceleration rate.

20 Claims, 6 Drawing Figures

ELECTRONIC MOTOR VEHICLE SPEED CONTROL APPARATUS

BACKGROUND OF THE INVENTION

1. Field of the Invention

This invention generally relates to speed control apparatus and more particularly to programmable motor vehicle maximum speed limiters.

2. Description of the Prior Art

The increases number of accidents and deaths on the highways has created a need for improved motor vehicle safety features and selective motor vehicle driver control measures. Indirect control measures by traffic authorities and insurance companies over drivers of motor vehicles have, in the past, ineffectively curbed the increased accident and death rates on the highways. Traffic authorities have more rigidly enforced the traffic laws and have assessed greater penalties against the offender; however, the extent of traffic law enforcement that can be effectively enforced on a personal basis is, at best, inadequate. Insurance companies have classified motor vehicle drivers into various insurance risk groups according to their age, sex, occupation and the like, and have assessed higher insurance premiums against those drivers falling in the higher risk groups. Increased insurance premiums, however, do not place positive driving restrictions upon a motor vehicle operator. Therefore, more positive controls, tailored to the individual driver, are required. In the past, such controls have been impractical or prohibitively expensive to implement.

One such control apparatus is a speed limiter for limiting the maximum speed an automobile can attain. Such devices, typically called governors, are not new in the art and have been used with varying degrees of success in the past. A first type of prior art governor, the fixed governor, is preset for a single absolute speed. Such governors are typically of mechanical construction and are operatively connected with the carburetor or gas supply of a motor vehicle. While effectively limiting the maximum speed of a vehicle, the fixed governor is generally impractical for wide-spread use. Since today's motor vehicles are generally driven by a number of individuals in various insurance risk groups, a fixed governor set for a low maximum speed to accommodate the highest risk driver would penalize the lower risk drivers of that automobile. The fixed speed governor also does not generally provide for emergency passing situations which require increased acceleration and momentary attainment of speeds in excess of the maximum set speed limit.

A second type of speed limiter which has been employed in the prior art provides an adjustable setting by which an operator of the motor vehicle can set the maximum speed of the vehicle. This type of speed limiter is obviously inadequate as a positive safety measure for controlling a number of drivers of varied insurance risk classifications since the driver can bypass the speed limiter entirely by setting it to any desired excessive maximum speed.

A third type of speed limiter in the prior art, recognizing the need for a plurality of preset maximum speed limits in a single apparatus which can be selectively activated by different operators of the motor vehicle, employed a plurality of input circuits, each connected to provide a preset maximum speed limit, and each activated by a different key. Such an apparatus provided definite safety advantages over the single speed and the freely adjustable governors, but required individual keys for activation of its plurality of inputs. Such an apparatus still did not provide an adequate method for limiting a motor vehicle's speed based upon its operator since a high risk driver could avoid using his designated low maximum speed setting by gaining access to a key which would activate a higher speed limit. Further, in the event of a lost or stolen key, reprogramming of the apparatus required an expensive changing of one or more lock mechanisms of the system. This system also did not provide any safeguards against activation thereof by an intoxicated person.

Beside the three governor speed limiters, a number of speed control devices, commonly called "cruise controls," have appeared in the prior art for maintaining the speed of a vehicle at a preselected speed. These devices, while employing some of the principles of speed limiting are not in a true sense safety control devices, since an operator of the vehicle can exceed the selected cruise speed at any time.

The present invention overcomes the shortcomings of the prior art speed limiters by providing an inexpensive and programmable speed limiting apparatus adapted for installation in any type of engine-powered motor vehicle. The speed limiting apparatus of the present invention provides a plurality of predetermined maximum speed limits which are selectively initiated by unique operator input codes, wherein the operator input codes may be provided by an insurance company, traffic authorities, or the like. The speed limiting apparatus automatically adjusts the maximum speed attainable by the motor vehicle in accordance to the particular driver of the motor vehicle as indicated by the operator input code entered into the apparatus. The present invention also provides protection against operation of the motor vehicle by an intoxicated driver, even if he knows his operator code, and provides a direct measure of theft protection for the motor vehicle.

While the present invention will be described in conjunction with specific electrical circuits, it will be understood that the invention is not limited to these particular circuits, but that any functionally equivalent circuits can be employed. Further, while the present invention, as described, employs a particular type of operator input code, it will be understood that the invention is not limited to the use of this type of input code, but that other codes and associated decoding circuits may be employed within the spirit and intent of this invention.

SUMMARY OF THE INVENTION

In the present invention, an electronic programmable maximum speed limiter is operatively adapted for connection into the electrical system of a motor vehicle. An input code selector panel enables operators of the motor vehicle to enter a plurality of operator input codes into the speed limiter. A programming circuit operatively connects the selector panel with decoding logic. The programming circuit is inaccessible to the operator of the vehicle but may be readily programmed by an insurance company representative, by an automobile dealers, or the like. The programming circuit pre-programs the speed limiter apparatus to operatively recognize only a selected plurality of unique operator input codes. The operator codes may be selectively issued in confidence to various operators of the motor vehicle by insurance companies, according to the particular insurance risk group of the motor vehicle operator.

Upon receipt of one of the unique input codes, the decoder logic conditions control circuits of the system for limiting the maximum vehicle speed to that speed pre-programmably associated with that unique operator input code received. For example, a high insurance risk driver would have an input code corresponding to a low speed limit whereas a low insurance risk driver would have an operator input code corresponding to a significantly higher maximum speed limit.

A speed sensor, operatively connected with the speedometer of the motor vehicle, provides to the control circuits an indication of the actual vehicle speed. The control circuits, as conditioned by the received input code and in response to the actual speed signal from the speed sensor, limit the maximum speed of the vehicle by interrupting the energizing current to the vehicle's ignition coil whenever the active pre-programmed speed limit is exceeded. A safety feature incorporated into the control circuits enables an operator of the motor vehicle to occasionally exceed the activated pre-programmed speed limit for a short time duration, but prevents the operator from making excessive use of this safety feature.

The speed limiter of the present invention prevents energization of the engine of the vehicle until one of the unique operator input codes has been entered into the selector panel. An attempt to force recognition of an operator code by multiple activation of individual code selectors of the selector panel results in an absolute deenergization of the engine for a predetermined period of time. A further feature of the present invention, provides for non-recognition of the unique operator input codes if not entered in a timely manner, thus preventing excessively intoxicated drivers from activating the system even if they enter technically acceptable operator input codes. Other options of the automatic speed limiter include maximum acceleration control, and automatic maximum speed reduction upon energization of the automobile's lights or windshield wipers.

It is one object of the present invention, therefore, to provide an improved speed limiting apparatus for motor vehicles.

It is another object of the present invention to provide a programmable speed limiter for motor vehicles which is activated by unique operator input codes.

It is a further object of the present invention to provide a programmable speed limiter for motor vehicles for limiting the maximum speed of a motor vehicle to one of a plurality of pre-programmed speed limits, wherein each of the pre-programmed speed limits corresponds to one or more unique operator input codes.

It is a further object of the present invention to provide a programmable speed limiter apparatus for motor vehicles selectively activated by digital operator input codes.

It is still a further object of the present invention to provide a programmable speed limiter for motor vehicles which also controls the maximum acceleration of the vehicle.

These and other objects of my invention will become apparent to those skilled in the art upon consideration of the accompanying specifications, claims and drawings.

BRIEF DESCRIPTION OF THE DRAWINGS

Referring to the drawings wherein like numerals represent like parts throughout the several views.

DESCRIPTION OF THE PREFERRED EMBODIMENT

Figure 1:
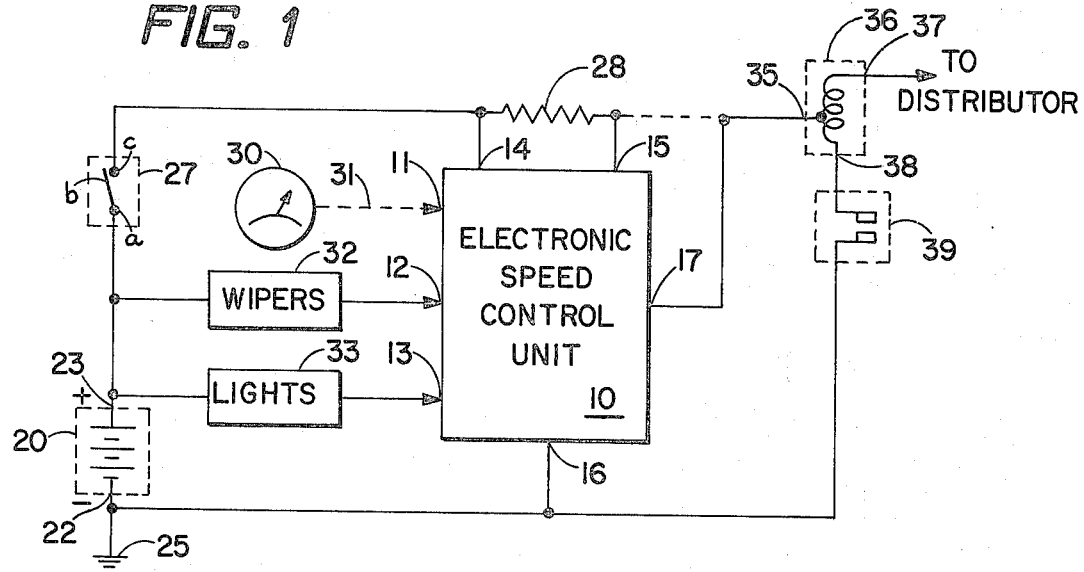
FIG. 1 is a diagrammatic representation illustrating the general connection of a preferred embodiment of the speed control unit of the present invention in a typical electrical system of a motor vehicle.

Referring to the figures, there is generally illustrated in FIG. 1, an electronic speed control unit 10 of the preferred embodiment as it would functionally and relatively appear as connected with the electrical system of a motor vehicle (not illustrated). The speed control unit 10 generally has a first signal input 11, a second signal input 12, and a third signal input 13. The speed control unit 10 further has a first power input 14, a second power input 15, a common terminal 16 and a signal output terminal 17.

A battery of the motor vehicle is generally illustrated at 20. The battery 20 has a negative terminal 22 adapted to be directly connected to a chassis ground 25 of the vehicle and further has a positive terminal 23.

The positive terminal 23 of the battery 20 is directly connected to a first stationary contact 27(a) of an ignition switch 27. The ignition switch 27 further has a movable contact 27(b) and a second stationary contact 27(c). The ignition switch 27 generally represents that portion of a motor vehicle's ignition switch which controls the energization of the ignition coil of the motor vehicle. The second stationary contact 27(c) of the ignition switch 27 is directly connected to the first power input 14 of the speed control unit 10 and is further connected by means of a ballast resistor 28 to the second power input 15 of the speed control unit 10.

The positive terminal 23 of the battery 20 is further connected by means of a wiper switch generally designated at 32 to the second signal input 12 of the speed control unit. The positive terminal 23 of the battery 20 is also connected by means of a light switch generally designated at 33 to the third signal input 13 of the speed control unit 10. The wiper and light switches 32 and 33 respectively generally represent those switches within the motor vehicle which respectively control the operative states of the windshield wipers and the external lights of the motor vehicle. The switches 32 and 33 respectively are normally operative in an electrically open mode.

A speedometer 30 of the motor vehicle is functionally connected, as hereinafter described, to the first signal input 11 of the speed control unit 10 by means of the signal flow path generally designated at 31.

The signal output terminal 17 of the speed control unit 10 is directly connected to an input 35 of an ignition coil 36 of the vehicle. The ignition coil further has a first signal output 37 which is directly connected to the distributor (not illustrated) of the vehicle. The ignition coil 36 also has a second output 38 connected by means of a pair of breaker points 39 of the vehicle to the common 25. The common output terminal 16 of the speed control unit 10 is directly connected to the common 25.

It will be noted that in the absence of the speed control unit 10 in that portion of the motor vehicle's electrical system illustrated in FIG. 1, the ballast resistor 28 would be directly connected between the ignition switch 27 and the input 35 of the ignition coil 36, as illustrated by the dashed line therebetween. Therefore, integration of the speed control unit 10 into an existing automobile's electrical system, requires only those connections to the terminals 11 through 17 of the speed control unit 10 illustrated in FIG. 1, and disconnection of the ballast resistor 28 from its normally direct contact with the input 35 of the ignition coil 36.

Figure 2:
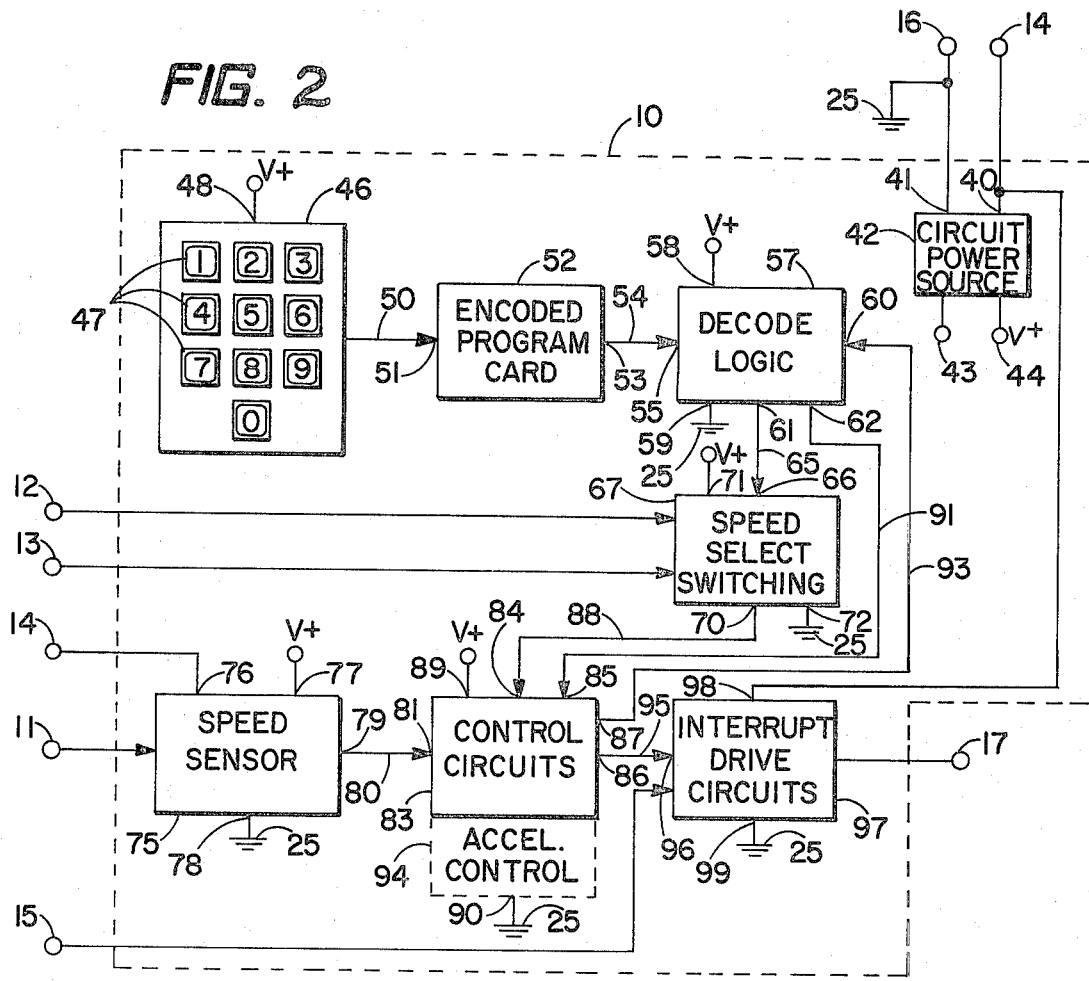
FIG. 2 is a general block diagram of the speed control unit disclosed in FIG. 1, illustrating its major functional elements.

A general block diagram of the speed control unit 10 is illustrated in FIG. 2. Referring to FIG. 2, the first power input terminal 14 of the speed control unit 10 is indirectly connected to a power input 40 of a circuit power source 42. The power source 42 further has a common input terminal 41 directly connected to the chassis ground 25, a common output terminal 43 and a supply output terminal 44. Except where otherwise indicated, the supply output terminal 44 and the common output terminal 43 of the power source 42 provide that regulated voltage source required for energizing the circuit elements of the speed control unit 10 to be hereinafter described. The supply output terminal 44 and the common output terminal 43 will respectively be alternatively termed herein as the common (25) and the V+ terminals.

A code input selector panel 46 has a plurality of selection buttons generally designated at 47. Each of the selection buttons 47 is associated with an electrical switch, as hereinafter described, and operatively closes an electrical circuit represented by that switch when depressed by an operator of the motor vehicle. The code input selector panel 46 also has a supply input terminal 48 directly connected to V+. The code input selector panel 46 is functionally connected by means of a signal flow path 50 to a signal input 51 of an encoded program card 52. The program card 52 further has a signal output 53.

The signal output 53 of the encoded program card 52 is functionally connected by means of a signal flow path 54 to a first signal input 55 of a decode logic block 57. It will be understood that with respect to the functional block diagram representation description of FIG. 2, an input or output terminal may represent a plurality of actual electrical connections, and a signal flow path may actually represent a plurality of electrical conductors.

The speed select logic block 57 further has a supply input terminal 58 directly connected to V+, a common terminal 59 directly connected to the common 25, a second signal input 60, a first signal output 61 and a second signal output 62.

The first signal output 61 of the decode logic block 57 is connected by means of a signal flow path 65 to a signal input 66 of a speed select switching block 67. The second and third signal inputs 12 and 13 respectively of the speed control unit 10 respectively form second and third signal inputs to the speed select switching block 67. The speed select switching block 67 further has a signal output 70, a supply input terminal 71 directly connected to V+, and a common terminal 72 directly connected to the common 25.

The first signal input 11 of the speed control unit 10 also provides a first signal input to a speed sensor block 75. The speed sensor 75 further has a first power input 76 directly connected to the first power input 14 of the speed control unit 10, a second supply input 77 directly connected to V+, a common terminal 78 directly connected to the common 25 and a signal output 79.

The signal output 79 of the speed sensor 75 is functionally connected by means of a signal flow path 80 to a first signal input 81 of a control circuit functional block 83. The control circuit block further has a second signal input 84, a third signal input 85, a first signal output 86, a second signal output 87, a supply input 89 directly connected to V+ and a common terminal 90 directly connected to the common 25. The signal output 70 of the speed select switching block 67 is directly connected by means of a signal flow path 88 to the second signal input 84 of the control circuit block 83. The second signal output 62 of the decode logic 51 is connected by means of a signal flow path 91 to the third signal input 85 of the control circuit 83. The second signal output 87 of the control circuits 83 is connected by means of a signal flow path 93 to the second signal input 60 of the decode logic 57.

An optional circuit block, termed acceleration control 94 and hereinafter described, may form an integral part of the control circuits 83 and is, therefore, illustrated in dashed lines attached thereto in FIG. 2.

The first signal output 86 of the control circuits 83 is functionally connected by means of a signal flow path 95 to a signal input 96 of an interrupt drive circuit block 97. The interrupt drive circuit 97 further has a first supply input 98 directly connected to the first power input 14 of the speed control unit 10, and a common terminal 99 directly connected to the common 25. The second power input 15 of the speed control unit 10 is also directly connected to the interrupt drive circuit block 97, as hereinafter described, and forms a second power input thereto. The signal output terminal 17 of the speed control unit 10 is coterminous with an output terminal of the interrupt drive circuit block 97.

Figure 3:
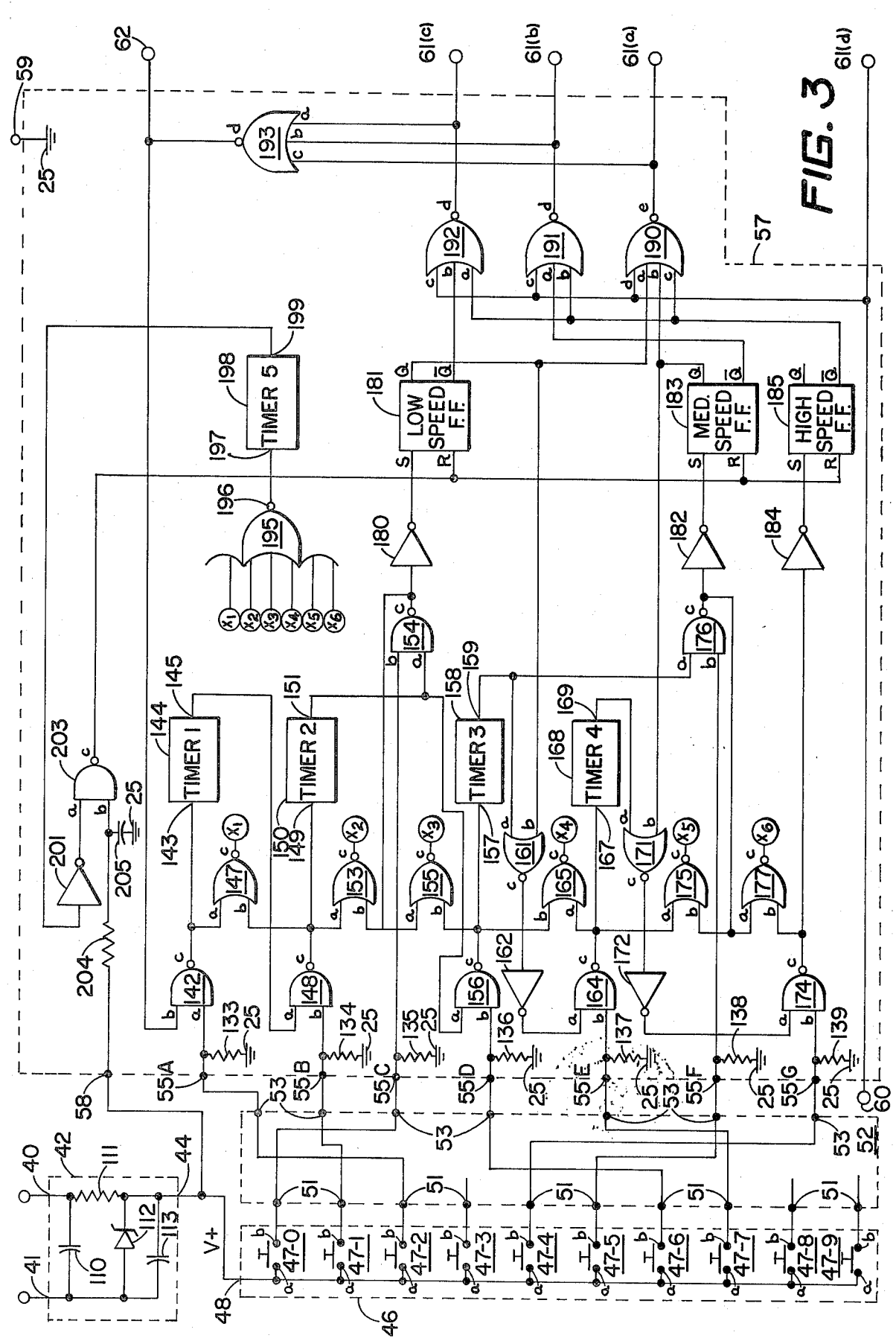
FIG. 3 is a schematic representation of the power source, the input selector, the encoded program card, and the decode logic portions of the speed control unit disclosed in FIG. 2.

The power source 42, the code input select panel 46, the encoded program card 52, and the decode logic 57 functional blocks are illustrated in more detail in FIG. 3. Referring to FIG. 3, the first power input 40 of the power source 42 is connected by means of a capacitor 110 to the common input terminal 41, and is further connected by means of a resistor 111 to the V+ output terminal 44. The V+ terminal 44 is further connected by means of a zener diode 112 in parallel with a capacitor 113 to the common terminal 41. In the preferred embodiment, the zener voltage of the diode 112 is 10 volts and provides the required bias voltage for the complimentary MOS (CMOS) logic gates employed in the system. The capacitors 110 and 113, the resistor 111 and the zener diode 112 form the circuit elements of the power source 42. It will be recognized that the configuration of the power source employed is not unique, but depends upon the bias requirements of the electrical circuits employed in the system.

The code input selector panel 46 of the preferred embodiment consists of a plurality of electrical switches 47-0 through 47-9 corresponding in designation to the plurality of selection buttons illustrated in FIG. 2. Each of the switches 47-0 through 47-9 has a movable contact operatively connected with different ones of the plurality of selection buttons 47 (FIG. 2) of the code input selector panel 46. Each of the switches 47-0 through 47-9 further has a pair of stationary contacts generally designated at (a) and (b), and cooperatively operable with the movable contacts of their associated switches. In the preferred embodiment, the movable contact of each switch is positioned in a normally open position and closes the electrical circuit between its respective stationary contacts (a) and (b) when its associated selector button 47 is depressed. It will be noted that any type of switching elements can be employed in the code input selector panel 46 within the spirit and intent of this invention. The stationary contacts 47-0(a) through 47-9(a) are directly connected to the supply terminal 48(V+) of the code input selector panel 46.

The signal input 55 of the decode logic circuits 57 generally consists of a plurality of individual signal input terminals designated as 55(A) through 55(G). It will be understood, that the signal flow path 54 leading to the input terminal 55 consists of that plurality of connectors operatively connected to provide signal inputs to the inputs 55(A) through 55(G) from the encoded program card 52.

The encoded program card 52 consists of one of a plurality of predetermined interconnecting wiring arrangements (or "programs") between the stationary contacts 47-0(b) through 47-9(b) of the code input selector panel 46 and the inputs 55(A) through 55(G) of the decode logic 57. For the purposes of describing a typical operation of the preferred embodiment, one specific interconnecting programmed arrangement for the encoded program card 52 has been illustrated.

It will be noted that not all of the available selector switches 47-0 through 47-9 are required for providing input drive signals to the inputs 55(A) through 55(G) of the decode logic 57. In particular, when using that encoded program card 52 illustrated, the selector switches 47-3, 47-8 and 47-9 are not employed to drive the decode logic 57. For that encoded program card 52 illustrated in FIG. 3: the stationary contact 47-2(b) is directly connected to the signal input 55(A); the stationary contact 47-1(b) is directly connected to the input terminal 55(B); the stationary contact 47-0(b) is directly connected to the input terminal 55(C); the stationary contact 47-6(b) is directly connected to the input terminal 55(D); the stationary contact 47-7(b) is directly connected to the input terminal 55(E); the stationary contact 47-5(b) is directly connected to the input terminal 55(F); and the stationary contact 47-4(b) is directly connected to the input terminal 55(G).

The signal inputs 55(A) through 55(G) are respectively connected by means of resistors 133 through 139 to the common 25. For ease of description, it will be understood that the common terminal 59 of the decode logic circuits 57 is directly connected to the common 25 and will be used coterminously therewith. Further, for ease of description it will be understood that each of the logic and timing circuits of the decode logic block 57 is connected to the V+ supply by means of the supply input terminal 58 and to the common 25 by means of the common input terminal 59.

The signal input 55(A) of the decode logic 57 is also directly connected to a first input 142(a) of a NAND gate 142. The NAND gate 142 further has a second input 142(b) and a signal output 142(c). The output 142(c) of the gate 142 is directly connected to a signal input 143 of a first timer circuit 144.

The timer 144 further has a signal output 145. The first timer 144, and all other timers described herein, consist of a one-shot monostable multivibrator circuit, well known in the art and will not be described in detail herein. For ease of description, the biasing, stabilizing resistors and capacitors associated with the one-shot multivibrator circuits employed herein have not been illustrated but are understood to be represented within the functional blocks depicted. In the preferred embodiment, circuits of the Signetics 555 type are employed as the basic one-shot timing circuits. In general, however, each one-shot timer circuit is normally operative to provide a logical low signal at its output terminal when operative in its "stable" state, and becomes operative in a quasi-stable state upon receipt of a negative going pulse at its input terminals, to provide a logical high at its output terminal for a predetermined period of time before returning to its stable state. The period of time at which a one-shot multivibrator remains in its quasi-stable state is determined by the capacitive and resistive biasing of the circuit. In the preferred embodiment, the first timer 144 is operative in its quasi-stable state for 0.5 seconds, and is therefore referred to as a 0.5 second timer.

The signal output 142(c) of the gate 142 is also directly connected to a first input 147(a) of a NOR gate 147. The gate 147 further has a second input 147(b) and a signal output 147(c).

The signal output 145 of the first timer 144 is directly connected to a first input 148(a) of a NAND gate 148. The gate 148 further has a second input 148(b) and a signal output 148(c). The signal input 55(B) of the decode logic 57 is directly connected to the second input 148(b) of the gate 148. The output 148(c) of the gate 148 is directly connected to the second input 147(b) of the NOR gate 147.

The signal output 148(c) of the gate 148 is also directly connected to a signal input 149 of a second timer 150. The second timer 150 further has a signal output 151. The second timer 150 is of the one-shot multivibrator type as previously described, and is a 0.5 second timer in the preferred embodiment.

The output 148(c) of the NAND gate 148 is also directly connected to a first input 153(a) of a NOR gate 153. The gate 153 further has a second signal input 153(b) and a signal output 153(c).

The signal output 151 of the second timer 150 is directly connected to a first input 154(a) of a NAND gate 154. The gate 154 further has a second signal input 154(b) and a signal output 154(c). The output 154(c) of the gate 154 is directly connected to the second input 153(b) of the NOR gate 153 and is also directly connected to a first input 155(a) of a NOR gate 155. The signal input 55(C) to the decode logic 57 is directly connected to the second input 154(*b*) of the gate 154.

The NOR gate 155 further has a second signal input 155(*b*) and a signal output 155(*c*).

The signal output 151 of the second timer 150 is also directly connected to a first input 156(*a*) of a NAND gate 156. The NAND gate 156 further has a second input 156(*b*) and a signal output 156(*c*). The signal input 55(D) of the decode logic 57 is directly connected to the second input 156(*b*) of the gate 156.

The signal output 156(*c*) of the gate 156 is directly connected to the second input 155(*b*) of the NOR gate 155 and is further directly connected to a signal input 157 of a third timer 158. The timer 158 further has a signal output 159. The third timer 158 is of the one-shot multivibrator type previously described and is in the preferred embodiment a 0.5 second timer.

The signal output 159 of the third timer 158 is directly connected to a first signal input 161(*a*) of a NOR gate 161. The NOR gate 161 further has a second signal input 161(*b*) and a signal output 161(*c*). The signal output 161(*c*) of the gate 161 is connected by means of an inverter 162 to a first input 164(*a*) of a NAND gate 164.

The NAND gate 164 further has a second signal input 164(*b*) and a signal output 164(*c*). The signal input 55(E) of the decode logic 57 is directly connected to the second input 164(*b*) of the gate 164.

The signal output 164(*c*) of the gate 164 is directly connected to a first input 165(*a*) of a NOR gate 165. The NOR gate 165 further has a second signal input 165(*b*) and a signal output 165(*c*). The signal output 156(*c*) of the NAND gate 156 is directly connected to the second input 165(*b*) of the NOR gate 165.

The output 164(*c*) of the NAND gate 164 is also directly connected to a signal input 167 of a fourth timer 168. The timer 168 also has a signal output 169. The fourth timer 168 is of the one-shot multivibrator type previously described and is in the preferred embodiment a 0.5 second timer.

The signal output 169 of the fourth timer 168 is directly connected to a first input 171(*a*) of a NOR gate 171. The NOR gate 171 further has a second input 171(*b*) and a signal output 171(*c*). The output 171(*c*) of the NOR gate 171 is connected by means of an inverter 172 to a first signal input 174(*a*) of a NAND gate 174.

The NAND gate 174 further has a second signal input 174(*b*) and a signal output 174(*c*). The signal input 55(G) of the decode logic 57 is directly connected to the second input 174(*b*) of the NAND gate 174.

The signal output 164(*c*) of the NAND gate 164 is also directly connected to a first signal input 175(*a*) of a NOR gate 175. The NOR gate 175 further has a second signal input 175(*b*) and a signal output 175(*c*).

The signal output 159 of the third timer 158 is also directly connected to a first signal input 176(*a*) of a NAND gate 176. The NAND gate 176 further has a second signal input 176(*b*) and a signal output 176(*c*). The signal input 55(F) of the decode logic 57 is directly connected to the second input 176(*b*) of the gate 176. The signal output 176(*c*) of the gate 176 is directly connected to the second input 175(*b*) of the NOR gate 175 and is further directly connected to a first input 177(*a*) of a NOR gate 177.

The NOR gate 177 further has a second signal input 177(*b*) and a signal output 177(*c*). The signal output 174(*c*) of the NAND gate 174 is directly connected to the second signal input 177(*b*) of the gate 177.

The signal output 154(*c*) of the NAND gate 154 is further connected by means of an inverter 180 to a "set" input 181(S) of a "low speed" flip-flop 181. The flip-flop 181 further has a reset input 181(R), a logical high output 181(Q) and a logical low signal output 181($\overline{Q}$). The flip-flop 181 and all other flip-flops to be described herein are well known in the art and will not be described in detail. In general, however, the Q and $\overline{Q}$ flip-flop outputs respectively attain logical low and logical high levels upon receipt of a logical high (reset) signal at the reset input 181(R) of the flip-flop. Those logical levels of the Q and $\overline{Q}$ outputs are maintained until a logical high ("set") signal is received at the set input 181(S) of the flip-flop, at which time the Q and $\overline{Q}$ signal outputs respectively switch logical states and attain logical high and logical low levels respectively.

The signal output 181(Q) of the flip-flop 181 is directly connected to the second input 161(*b*) of the NOR gate 161. The signal output 181(Q) of the flip-flop 181 is also further directly connected to a first input 190(*a*) of a NOR gate 190.

The NOR gate 190 further has a second signal input 190(*b*), a third signal input 190(*c*), a fourth signal input 190(*d*) and a signal output 190(*e*).

The signal output 176(*c*) of the NAND gate 176 is also connected by means of an inverter 182 to a set input 183(S) of a "medium speed" flip-flop 183. The flip-flop 183 is functionally identical with the flip-flop 181. The flip-flop 183 further has a reset input 183(R), a logical high signal output 183(Q) and a logical low output 183($\overline{Q}$). The logical high output 183(Q) of the flip-flop 183 is directly connected to the second input 190(*b*) of the NOR gate 190 and is also directly connected to the second signal input 171(*b*) of the NOR gate 171.

The logical low output 183($\overline{Q}$) of the flip-flop 183 is directly connected to a first signal input 191(*a*) of a NOR gate 191. The NOR gate 191 further has a second signal input 191(*b*), a third signal input 191(*c*), and a signal output 191(*d*).

The signal output 174(*c*) of the NAND gate 174 is also connected by means of an inverter 184 to a set input 185(S) of a "high speed" flip-flop 185. The flip-flop 185 is functionally identical to the flip-flops 181 and 183 previously described. The flip-flop 185 further has a reset input 185(R), a logical high output 185(Q) and a logical low output 185($\overline{Q}$). In the preferred embodiment, the logical high output 185(Q) of the flip-flop 185 is unconnected. The logical low output 185($\overline{Q}$) of the flip-flop 185 is directly connected to the third signal input 190(*c*) of the NOR gate 190 and is also directly connected to the second signal input 191(*b*) of the NOR gate 191.

The logical low output 185($\overline{Q}$) of the flip-flop 185 is further directly connected to a first signal input 192(*a*) of a NOR gate 192. The NOR gate 192 further has a second signal input 192(*b*), a third signal input 192(*c*) and a signal output 192(*d*). The logical low signal output 181($\overline{Q}$) of the flip-flop 181 is directly connected to the second signal input 192(*b*) of the NOR gate 192.

The signal inputs 190(*d*), 191(*c*) and 192(*c*) of the NOR gates 190, 191 and 192 respectively are directly connected to the second signal input 60 of the decode logic block 57.

The signal outputs 192(d), 191(d) and 190(e) of the gates 192, 191 and 190 respectively are respectively directly connected to a first 193(a), a second 193(b), and a third 193(c) input of a NOR gate 193. The NOR gate 193 further has a signal output 193(d). The signal input 60 is also fed through as an output to the speed select switching block 67. The signal outputs 190(e), 191(d) and 192(d) of the gates 190, 191 and 192 and the fed through conductors from the input 60 collectively form the signal output 61 of the decode logic block 57 and are respectively designated as 61(a), 61(b), 61(c) and 61(d).

The signal output 193(d) of the NOR gate 193 is also directly connected to the second signal input 142(b) of the NAND gate 142. The signal output 193(d) of the NOR gate 193 also is directly connected to the second signal output 62 of the decode logic 57.

To simplify the schematic diagram of FIG. 2, the signal outputs 147(c), 153(c), 155(c), 165(c), 175(c) and 177(c) of the NOR gates 147, 153, 155, 165, 175 and 177 respectively are illustrated as terminating at a plurality of conductor symbols respectively designated as X1 through X6. The plurality of conductors X1 through X6 are directly connected to a plurality of inputs of like designation of a NOR gate 195. The NOR gate 195 further has a signal output 196.

The output 196 of the NOR gate 195 is directly connected to a signal input 197 of a fifth timer 198. The fifth timer 198 further has a signal output 199. The fifth timer 198 is of the one-shot multivibrator type as previously described and is, in the preferred embodiment, a 5 minute timer.

The signal output 199 of the timer 198 is connected by means of an inverter 201 to a first input 203(a) of a NAND gate 203. The gate 203 further has a second signal input 203(b) and a signal output 203(c).

The V+ supply input 58 of the decode logic 57 is connected by means of a resistor 204 in series with a capacitor 205 to the common 25 and is further connected by means of the resistor 204 to the second signal input 203(b) of the gate 203. The signal output 203(c) of the gate 203 is directly connected to the reset inputs 181(R), 183(R) and 185(R) respectively of the flip-flops 181, 183 and 185.

Figure 4:
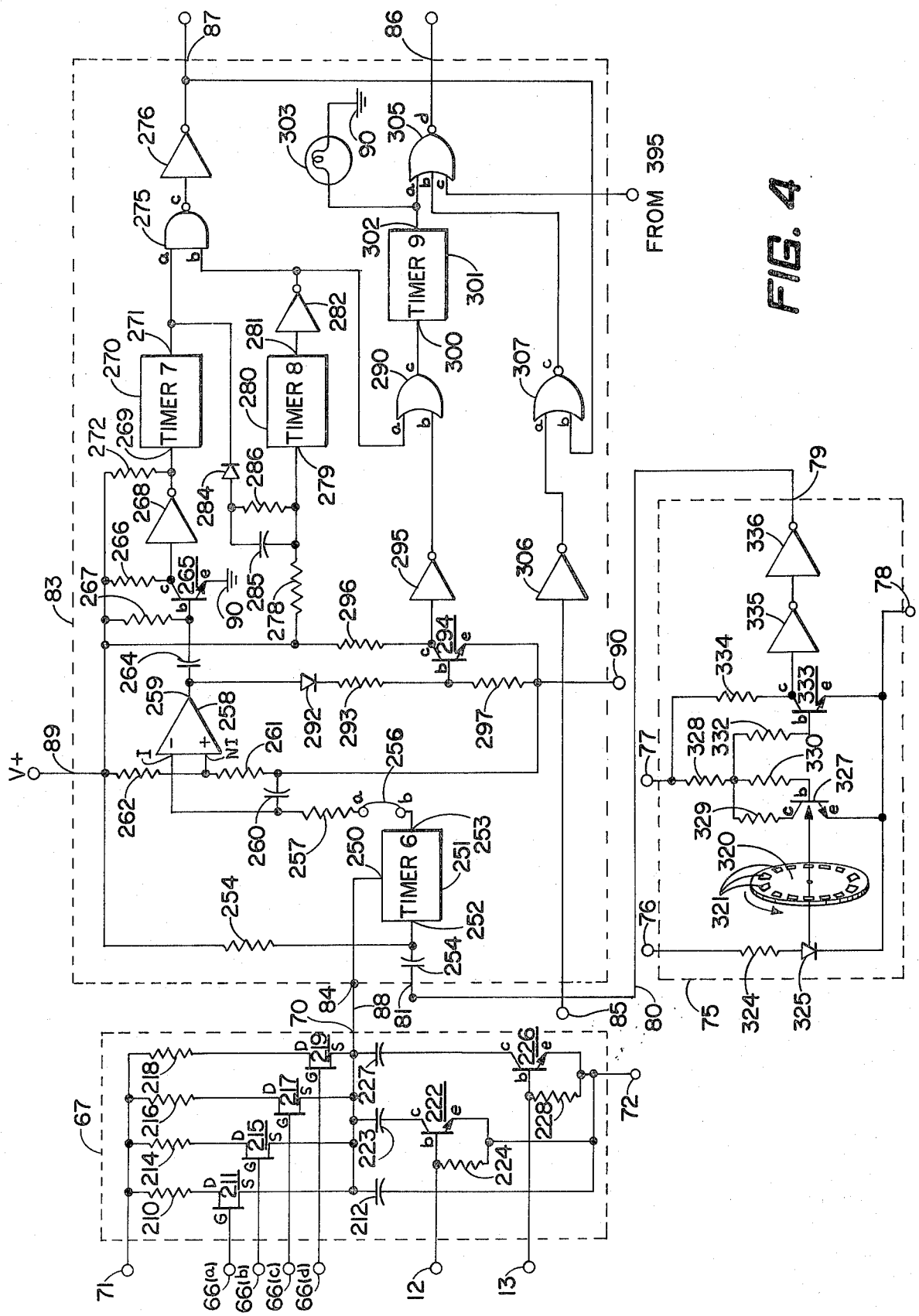
FIG. 4 is a schematic representation of the speed sensor, the speed select switching, and the control circuit portions of the speed control unit disclosed in FIG. 2.

The speed select switching 67, the speed sensor 75 and the control circuit 83 functional block portions of the electronic speed control unit 10 (FIG. 2) are illustrated in more detail in FIG. 4. Referring to FIG. 4, the output terminals 61(a) through 61(d) of the decode logic block 57 are directly respectively connected by means of a plurality of individual conductors representing the signal flow path 65 (FIG. 2) to a plurality of input terminals 66(a) through 66(d) comprising the signal flow input terminal 66 of the speed select switching block 67. The supply input 71 to the speed select switching block 67 is connected by means of a resistor 210 to a drain 211(D) of a field effect transistor (FET) 211. The FET 211 further has a gate 211(G) and a source 211(S). The input terminal 66(a) is directly connected to the gate 211(G) of the FET 211. The source 211(S) of the FET 211 is directly connected to the output terminal 70 of the speed select switching block 67 and is also connected by means of a capacitor 212 to the common terminal 72 of the speed select switching block 67.

The supply terminal 71 of the speed select switching block 67 is also connected by means of a resistor 214 to the drain 215(D) of a FET 215. The FET 215 further has a gate 215(G) and a source 215(S). The input terminal 66(b) is directly connected to the gate 215(G), and the source 215(S) of the FET 215 is directly connected to the output terminal 70 of the speed select switching block 67.

The supply terminal 71 is also connected by means of a resistor 216 to a drain 217(D) of a FET 217. The FET 217 further has a gate 217(G) directly connected to the input terminal 66(c) and a source 217(S) directly connected to the output terminal 70 of the speed select switching block 67.

The supply terminal 71 is further connected by means of a resistor 218 to a drain 219(D) of a FET 219. The FET 219 further has a gate 219(G) directly connected to the input terminal 66(d) and a source 219(S) directly connected to the output terminal 70 of the speed select switching block 67. In the preferred embodiment, the FETs 211, 215, 217 and 219 are N-channel devices employed as switching transistors and are formed within a single packaged unit.

The second signal input 12 of the speed control unit 10 is directly connected to a base 222(b) of an NPN transistor 222. The transistor 222 further has a collector 222(c) connected by means of a capacitor 223 to the signal output 70 of the speed select switching block 67, and further has an emitter 222(e) directly connected to the common terminal 72 of the speed select switching block 67. A biasing resistor 224 is connected between the base 222(b) and the emitter 222(e) of the transistor 222.

The third signal input 13 of the speed control unit 10 is directly connected to a base 226(b) of an NPN transistor 226. The transistor 226 further has a collector 226(c) connected by means of a capacitor 227 to the signal output 70 of the speed select switching block 67 and also has an emitter 226(e) directly connected to the common terminal 72 of the speed select switching block 67. A bias resistor 228 is connected between the base 226(b) and the emitter 226(e) of the transistor 226.

As illustrated in FIGS. 2 and 4, the signal output 70 of the speed select switching block 67 is connected to and provides signal flow to the control circuits 83 by means of the signal flow path 88 connected to the input terminal 84 of the control circuits 83. Referring to FIG. 4, the signal input 84 of the control circuits 83 is directly connected to a timing input 250 of a sixth timer 251. The timer 251 is of the one-shot multivibrator type previously described and, in the preferred embodiment, is operable in its quasi-stable state for a time period determined by the particular resistive/capacitive load applied to its timing input 250 by means of the speed select switching block 67. Therefore, the time constant of the sixth timer 251 is selectably variable through the speed select switching block 67. The timer 251 further has a signal input 252 and a signal output 253. The first signal input 81 of the control circuits block 83 is connected by means of a capacitor 254 to the signal input 252 of the sixth timer 251. The V+ supply terminal 89 of the control circuits 83 is connected by means of a resistor 254 to the signal input 252 of the timer 251.

The signal output 253 of the timer 251 is directly provided as an output of that portion of the control circuits block 83 illustrated in FIG. 4 for connection to the acceleration control circuitry 94 to be hereafter described. The signal output 253 of the timer 251 is also connected by means of a jumper wire 256 having terminations labled (a) and (b) and a resistor 257 to an inverting input 258(I) of an operational amplifier 258. The amplifier 258 further has a non-inverting input 258(NI) and a signal output 259. The signal output 253 of the timer 251 is also connected by means of the resistor 257 in series with a capacitor 260 and a resistor 261 to the non-inverting input 258(NI) of the amplifier 258. The supply input 89 of the control circuits 83 is connected by means of a resistor 262 to the non-inverting input 258(NI) of the amplifier 258. The non-inverting input 258(NI) of the amplifier 258 is also connected by means of the resistor 261 to the common terminal 90. The resistors 261 and 262 provide a voltage divider signal input to the non-inverting input 258(NI) of the amplifier 258.

It will be understood that although not illustrated in FIG. 4, the timer networks, the logic elements and the amplifiers are operatively connected to the positive (V+) supply and the common (25) terminals of their respective functional blocks.

The signal output 259 of the amplifier 258 is connected by means of a capacitor 264 to a base 265(b) of an NPN transistor 265. The transistor 265 further has an emitter 265(e) directly connected to the common terminal 90 and further has a collector 265(c) connected by means of a resistor 266 to the V+ supply terminal 89. The supply terminal 89 is further connected by means of a resistor 267 to the base 265(b) of the transistor 265.

The collector 266(c) of the transistor 266 is also connected by means of an inverter 268 to a signal input 269 of a seventh timer 270. The timer 270 is of the one-shot multivibrator type previously described and is, in the preferred embodiment, a twenty second timer. The timer 270 further has a signal output 271. The V+ terminal 89 of the control circuits 83 is connected by means of the resistor 272 to the signal input 269 of the timer 270.

The signal output 271 of the timer 270 is directly connected to a first signal input 275(a) of a NAND gate 275. The NAND gate 275 further has a second signal input 275(b) and a signal output 275(c). The signal output 275(c) of the NAND gate 275 is connected by means of an inverter 276 to the second signal output 87 of the control circuits 83 and provides a signal input to the decode logic functional block 57 (see FIG. 2).

The V+ supply terminal 89 is also connected by means of a resistor 278 to a signal input 279 of an eighth timer 280. The timer 280 is of the one-shot multivibrator type previously described and is, in the preferred embodiment, a 10 minute timer. The timer 280 has a signal output 281 connected by means of an inverter 282 to the second signal input 275(b) of the NAND gate 275.

The signal output 271 of the timer 270 is also connected by means of a back biased diode 284 in series with a capacitor 285 connected in parallel with a resistor 286 to the signal input 279 of the timer 280.

The signal output 281 of the timer 280 is also connected by means of the inverter 282 to a first signal input 290(a) of an OR gate 290. The OR gate 290 further has a second signal input 290(b) and a signal output 290(c).

The signal output 259 of the operational amplifier 258 is further connected by means of a diode 292 and a resistor 293 to a base 294(b) of an NPN transistor 294. The transistor 294 further has an emitter 294(e) directly connected to the common terminal 90 and a collector 294(c) connected by means of an inverter 295 to the second signal input 290(b) of the OR gate 290. A bias resistor 296 is connected between the collector 294(c) of the transistor 294 and the V+ input terminal 89 of the control circuits 83. A bias resistor 297 is connected between the base 294(b) of the transistor 294 and the common terminal 90.

The signal output 290(c) of the OR gate 290 is directly connected to a signal input 300 of a ninth timer 301. The timer 301 is of the one-shot multivibrator type previously described and is, in the preferred embodiment, a 1 second timer. The timer 301 further has a signal output 302 connected by means of an indicator lamp 303 to the common terminal 90 and also directly connected to a first signal input 305(a) of a NOR gate 305. The NOR gate 305 further has a second input 305(b), a third signal input 305(c) and a signal output 305(d).

The third signal input 85 of the control circuits 83 is connected by means of an inverter 306 to a first signal input 307(a) of a NOR gate 307. The NOR gate 307 further has a second signal input 307(b) and a signal output 307(c), which is directly connected to the second signal input 305(b) of the NOR gate 305. The signal output 275(c) of the NAND gate 275 is connected by means of the inverter 276 to the second signal input 307(b) of the NOR gate 307.

The third signal input 305(c) of the NOR gate 305 is available for connection to the acceleration control circuits 94 as hereinafter described. The signal output 305(d) of the NOR gate 305 is directly connected to the first signal output 86 of the control circuits 83 and provides signal flow to the interrupt drive circuits 97 (see FIG. 2).

The speed sensor functional block 75 of the speed control unit 10 generally includes a disc 320 having a plurality of circumferentially spaced apertures 321 formed therein and mounted for rotation with a rotating disc drive mechanism (not shown) of the speedometer 30 of the motor vehicle, to which the speed control unit 10 is attached. The battery supply terminal 76 of the speed sensor 75 is connected by means of a resistor 324 and a light emitting diode 325 to the common terminal 78 of the speed sensor 75. The light emitting diode 325 is aligned adjacent the rotating disc 320 and in proximity with the circumferentially spaced apertures therein such that light emitted from the diode 325 when energized will pass through the apertures 321 and impinge upon a photosensitive transistor 327 also aligned adjacent the rotating disc 320 but on that side thereof opposite the diode 325.

The photosensitive transistor 327 has an emitter 327(e) directly connected to the common terminal 78 of the speed sensor 75, a base 327(b) and a collector 327(c). The V+ supply terminal 77 of the speed sensor 75 is connected by means of a first resistor 328 in series with a second resistor 329 to the collector 327(c) of the transistor 327 and is further connected by means of the resistor 328 in series with a third resistor 330 to the base 327(b) of the transistor 327.

The V+ supply terminal 77 of the speed sensor 75 is also connected by means of the resistor 328 in series with a resistor 332 to a base 333(b) of an NPN transistor 333. The tranaistor 333 further has an emitter 333(e) directly connected to the common 78 and a collector 333(c). A bias resistor 334 is connected between the V+ supply terminal 77 and the collector 333(c) of the transistor 333.

The collector 333(c) of transistor 333 is further connected by means of a pair of serially connected inverters 335 and 336 to the signal output terminal 79 of the speed sensor 75. As previously described, the output terminal 79 of the speed sensor 75 is connected by means of the signal flow path 80 to provide input signals to the input terminal 81 of the control circuits 83.

Figure 5:
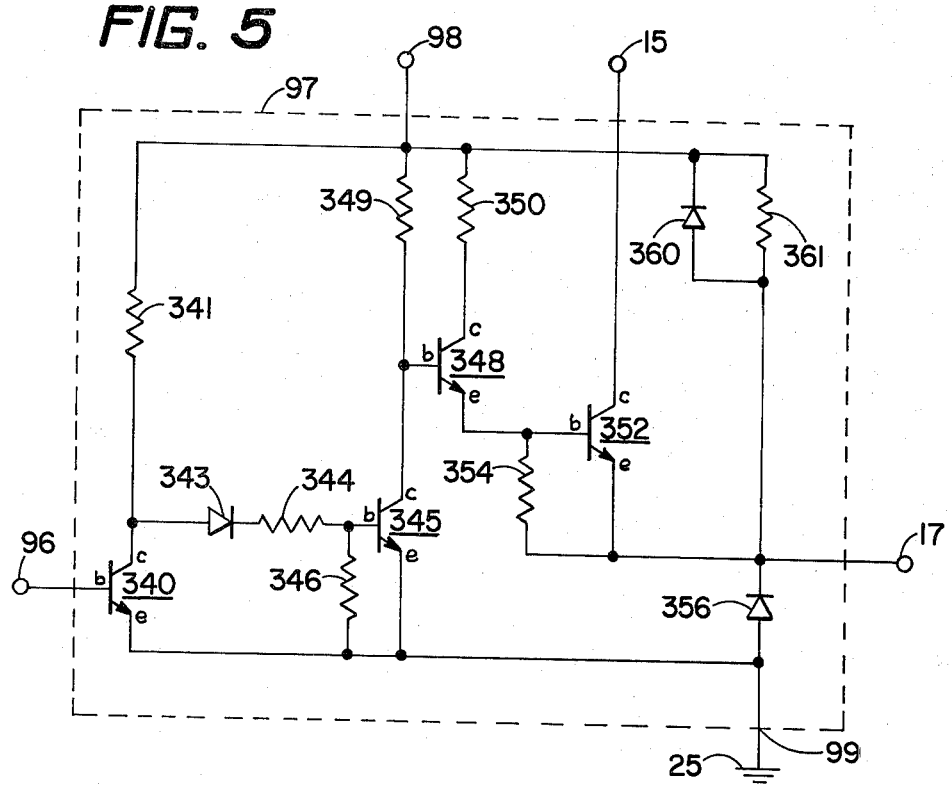
FIG. 5 is a schematic representation of the ignition interrupt switch portion of the speed control apparatus disclosed in FIG. 2.

The interrupt drive circuit 97 for providing the required high current switching control for interrupting current flow to the ignition coil 36 of the motor vehicle is illustrated in more detail in FIG. 5. Referring to FIG. 5, the signal input 96 of the interrupt drive circuit 97 is directly connected to a base 340(b) of an NPN transistor 340. The transistor 340 further has an emitter 340(e) directly connected to the common terminal 99 of the interrupt drive circuit 97 and a collector 340(c). A bias resistor 341 is connected between the battery input terminal 98 of the interrupt drive circuit 97 and the collector 340(c) of transistor 340.

The collector 340(c) of transistor 340 is also connected by means of a diode 343 and a resistor 344 to a base 345(b) of an NPN transistor 345. The transistor 345 further has an emitter 345(e) directly connected to the common terminal 99 and a collector 345(c). A bias resistor 346 is connected between the base 345(b) and a common input terminal 99.

The collector 345(c) of transistor 345 is directly connected to a base 348(b) of an NPN transistor 348. The transistor 348 further has an emitter 348(e) and a collector 348(c). The battery supply terminal 98 of the interrupt drive circuits 97 is connected by means of a bias resistor 349 to the base 348(b) of transistor 348 and is also connected by means of a bias resistor 350 to the collector 348(c) of the transistor 348.

The emitter 348(e) of transistor 348 is directly connected to a base 352(b) of an NPN transistor 352. The transistor 352 further has an emitter 352(e) directly connected to the output terminal 17 of the electronic speed control unit 10 and a collector 352(c) directly connected to the second power input 15 of the speed control unit 10. A bias resistor 354 is connected between the base 352(b) of transistor 352 and the output terminal 17. The emitter 352(e) of transistor 352 is also connected by means of a reverse biased diode 356 to the common terminal 99 of the interrupt drive circuits 97.

The battery supply terminal 98 is also connected by means of a reverse biased diode 360 in parallel with a resistor 361 to the output terminal 17 of the electronic speed control unit 10.

It will be understood that although a particular switching arrangement has been illustrated for interrupting the normal signal flow path to the ignition coil 36 of a motor vehicle, the interrupt drive circuits illustrated in FIG. 5 are not unique, and that a variety of such circuits may be employed within the spirit and intent of this invention.

Figure 6:
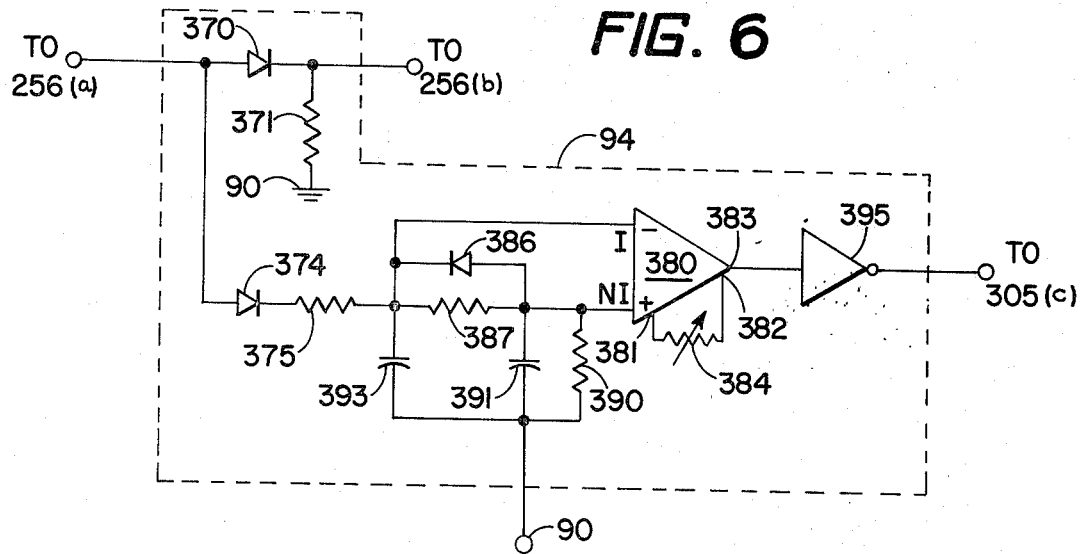
FIG. 6 is a schematic representation of the optional acceleration control portion of the speed control unit disclosed in FIG. 2.

The optional acceleration control circuit 94 (see FIG. 2) is illustrated in more detail in FIG. 6. Referring to FIGS. 4 and 6, the acceleration control circuit 94 can be added to the basic control circuits 83 by removing the jumper wire 256 between the output 253 of the sixth timer 251 and the resistor 257 and by connecting the terminals 256(a) and 256(b) illustrated thereat to those terminals of like number illustrated on the acceleration control circuit 94 in FIG. 6, and by connecting the output of the acceleration control circuit 94 to the third signal input 305(c) of the NOR gate 305.

Referring to FIG. 6, the input terminal 256(a) is connected by means of a diode 370 to the terminal 256(b), and is also connected by means of the diode 370 and a resistor 371 to the common terminal 90 of the control circuits 83.

The input terminal 256(a) is also connected by means of a diode 374 and a resistor 375 to an inverting input 380(I) of an operational amplifier 380. The amplifier 380 further has a noninverting input 380(NI), a first conpensating input 381, a second compensating input 382 and a signal output 383. A potentiometer 384 is connected between the compensating inputs 381 and 382 of the amplifier 380.

The inverting input 380(I) of the amplifier 380 is also connected by means of a back biased diode 386 in parallel with a resistor 387 to the non-inverting input 380(NI) of the amplifier 380. The non-inverting input 380(NI) of the amplifier 380 is also connected by means of a resistor 390 in parallel with a capacitor 391 to the common terminal 90 of the control circuits 83. The non-inverting input 380(NI) of the amplifier 380 is also connected by means of the resistor 387 and a capacitor 393 to the common terminal 90.

The signal output 383 of the amplifier 380 is connected by means of an inverter 395 to the third signal input 305(c) of the NOR gate 305 (see FIG. 4).

It will be understood that the operational amplifier 380 and the inverter 395 are properly operatively connected to the V+ supply 98 and the common supply 90 as previously discussed with respect to the control circuits 83.

OPERATION OF THE PREFERRED EMBODIMENT

The electronic speed control unit 10 of the preferred embodiment is generally operable to control the energizing drive current to the ignition coil 36 of a motor vehicle for limiting the maximum speed of the vehicle. Interruption of the current to the ignition coil 36 is a function of the particular operator input code entered into the code input selector panel 46, of the preprogrammed condition of the encoded program card 52, of the actual speed of the vehicle measured by the speed sensor 75, of the operative state of the windshield wipers and external lights of the vehicle, of the elapsed time since the last over-speed interruption, and of the acceleration rate of the vehicle. Additional features include prevention of energization of the vehicle's engine until a proper operation input code has been entered into the selector panel 46 and the non-recognition of proper input codes if not entered into the selector panel 46 in a timely manner.

A more detailed description of the preferred embodiment operation is made with reference to the figures. For simplifying the initial description of the preferred embodiment operation, it will be assumed that the acceleration control circuit 94 (FIG. 2) is not operatively connected in the electronic speed control unit 10.

A power-up sequence of the electronic speed control unit 10 occurs when an operator of the motor vehicle turns the ignition key of the motor vehicle so as to close the ignition switch 27 (FIG. 1). Upon closing of the ignition switch 27, the circuit power source 42 (FIGS. 2 and 3) is activated, causing a 10 volt V+ biasing signal to be applied to its signal output 44. The V+ signal biases the logical elements of the system for operative energization and enables the input code selector panel 46 for operation, as hereinafter described.

The V+ signal also provides a logical high signal by means of the input 58 of the decode logic 57 and the resistor 204 to the second signal input 203(b) of the NAND gate 203. The first signal input 203(a) of the NAND gate 203 already appears at a logical high level by means of the normally low logic level from the signal output 199 of the fifth timer 198, inverted by inverter 201 before application to the first signal input 203(a). However, the capacitor 205 delays application of a logical high signal from the signal input 58 of the decode logic block 57 to the second signal input 203(b) by the time constant determined by the values of the resistor 204 and the capacitor 205. During that charging time interval, the signal output 203(c) of the NAND gate 203 appears at a logical high and resets the flip-flops 181, 183 and 185 by means of their reset (R) inputs. When reset, the Q and $\overline{Q}$ signal outputs of the flip-flops 181, 183 and 185 respectively appear at logical low and logical high levels. When the capacitor 205 is sufficiently charged to cause the logical high signal to be applied to the second signal input 203(b) of the NAND gate 203, the signal output 203(c) of the gate will switch to a logical low and will thereafter be enabled for resetting the flip-flops upon a subsequent receipt of a logical low level at either one of its signal inputs 203(a) or 203(b).

In general, the interrupt drive circuits 97 control the flow of current to the ignition coil 36 by means of the signal output 17 of the drive circuits 97. Referring to FIG. 5, it will be noted that current flow from the battery supply terminal 15 to the signal output 17 of the interrupt drive circuit 97 is permitted whenever the transistor 352 is conducting and, in particular, when conducting in its saturation mode. Transistor 352 will conduct when the logical level of a signal applied to the signal input 96 of the drive curcuits 97 appear at a logical high. A logical high applied to the base 340(b) of the transistor 304 will drive it into saturation, causing a logical low level to be applied to the base 345(b) of the transistor 345, driving transistor 345 into cutoff. When transistor 345 is operative in its cutoff mode, its collector 345(c) will appear at a logical high, driving transistor 348 into saturation. Since transistors 348 and 352 are connected in the standard Darlington configuration, the output drive transistor 352 will also be driven into saturation, thus providing current flow to the ignition coil 36 by means of the signal output 17.

Since the current to the ignition coil 36 is of relatively high magnitude, the transistors of the control circuits 97 are powered directly from the battery by means of the first and second power inputs 14 and 15 of the electronic speed control unit 10 (see FIGS. 1 and 2). Except as otherwise provided, the circuit elements of the preferred embodiment are powered by means of the circuit power source 42 consisting of a simple 10 volt zener diode circuit for providing a regulated voltage output to the circuit elements. The diodes 360 and 356 (FIG. 5) protect the transistor junctions from extraneous spikes which may appear on their associated conductors. Current flow to the ignition coil 36 is interrupted whenever the output transistor 352 of the drive circuits 97 is biased into its cutoff region. This occurs when the signal applied to the input 96 of the drive circuits 97 appears at a logical low level. A logical low at the input 96 will bias the transistor 340 into cutoff, causing the transistor 345 to be driven into saturation and biasing the Darlington connected transistors 348 and 352 into their cutoff modes.

Before the interrupt drive circuits 97 can enable energization of the ignition coil 36, one of a plurality of unique operator input codes must be entered into the input code selector panel 46. In the preferred embodiment, the selector panel 46 is of the digital keyboard type, having 10 digitally numbered switch activating selector buttons 47(0)–47(9). Referring to FIGS. 2 and 3, an operator of the motor vehicle, upon depressing one of the selector buttons electrically closes the switch associated with that button, thus applying the V+ (logical high) level to the (b) contact of the associated switch. By sequentially depressing different ones of the selector buttons 47, an operator generates and enters an operator input code into the selector panel 46.

The encoded program card 52 provides the means for directing the entered operator input code to the decode logic circuits 57. In the preferred embodiment, the encoded program card 52 consists of a wiring arrangement (for example, a printed circuit card) which connects selected ones of the stationary contacts (b) of the switches 47-0 through 47-9 to the inputs 55(A) through 55(G) of the decode logic 57. In the preferred embodiment, the signal inputs 55(A) through 55(G) are each selectively connected to a single selector switch. The particular wiring arrangement provided by the encoded program card 52 defines a plurality of unique operator input codes. The unique operator input codes may be changed by rearranging the wiring (re-programming) of the encoded program card 52. This encoding section is intended to be generally inaccessible (i.e. not programmable by) an operator of the motor vehicle. It will also be noted that more elaborate encoding schemes could be employed within the spirit of this invention.

The encoded program card 52 illustrated in FIG. 3 has been "pre-programmed" to enable the decode logic 57 to recognize three unique operator input codes. Each code consists of a sequence of electrical signals applied by means of the selector panel 46 and the encoded program card 52 to the inputs 55(A) through 55(G) of the decode logic 57. For that encoded program card 52 illustrated in FIG. 3, those three unique operator input codes which will operatively activate the system consist of the following sequential depressions of the selector buttons 47: (high speed) 47-2, 47-1, 47-6, 47-7, 47-4; (medium speed) 47-2, 47-1, 47-6, 47-5, 47-4; and (low speed) 47-2, 47-1, 47-0, 47-7, 47-4. It will be noted that in the preferred embodiment, each unique operator input code is represented by five sequential electrical signals from different ones of the selector switches 47 and has been tagged according to the speed that code will cause the system to respond to, as hereinafter described. It will be apparent that the encoded program card 52 can be programmed to recognize additional input codes by connecting the unused input selector switches 47-3, 47-8 and 47-9 to predetermined ones of the input terminals 55(A) through 55(G) of the decode logic 57.

As will become apparent upon a more detailed description of the preferred embodiment, the decode logic 57 is designed to provide one of four output signal indications in response to the activation sequence of its signal inputs 55(A) through 55(G). In general, the input circuits of the decode logic 57 are operative to activate one of the flip-flops 181, 183 or 185 upon acceptance thereby of one of the unique operator input codes. In the preferred embodiment, the flip-flops 181, 183 and 185 are respectively designated as the low speed, the medium speed and the high speed flip-flops, respectively corresponding to three predetermined maximum speeds of the motor vehicle. Each of the unique operator input codes is operatively associated with one of the three predetermined speeds. The input logic of the decode logic block 57, therefore, recognizes a properly entered unique operator input code and sets the appropriate flip-flop (181, 183 or 185) associated therewith.

The operator input codes may be issued in confidence, by an insurance company or the like, to the various operators of a motor vehicle according to the particular insurance risk group in which they fall. A juvenile driver, for example, will be issued a unique operator input code, which when properly entered and decoded by the decode logic 57, will activate the low speed flip-flop 181. Similarly, a driver in a low insurance risk group (perhaps the father or mother of the juvenile) would be issued a unique operator code, which when properly entered and decoded, would activate the high speed flip-flop 185. Obviously, although three maximum speeds are designated, the speed control unit could be adapted to accommodate additional speed designations within the spirit and intent of this invention.

"Normal" operation as hereinafter employed will mean, that operative state of a circuit in which it appears prior to initial activation of the speed control unit (i.e. assuming an operator of the motor vehicle is attempting for the first time, to start the motor vehicle).

The flip-flops 181, 183 and 185 are normally operable in the absence of a logical high set signal at their set (S) inputs, to provide logical low and logical high signals respectively at their Q and $\overline{Q}$ outputs. Therefore, the normally logical high Q outputs of the low speed and medium speed flip-flops 181 and 183 respectively cause the signal outputs 192(d) and 191(d) of the NOR gates 192 and 191 respectively to assume logical low levels. The logical high of the $\overline{Q}$ output of the high speed flip-flop 185 maintains the output 190(e) of the NOR gate 190 at a logical low and further clamps the outputs 192(d) and 191(d) of the NOR gates 192 and 191 at a logical low level. Since all of the signal inputs of the NOR gate 193 are driven by the NOR gates 190, 191 and 192, the signal output 193(d) of the NOR gate 193 will normally assume a logical high, and drives the second input 142(b) of the NAND gate 142 therewith. The NAND gate 142, therefore, can normally be enabled by a logical high signal applied to its first signal input 142(a).

It will be noted that the signal inputs 55(A) through 55(G) provide direct signal flow to the input NAND gates 142, 148, 154, 156, 164, 176 and 174 respectively of the decode logic 57. When an operator enters one of the unique operator input codes into the system, he causes sequential activation of these input logic gates, which leads to activation of one of the flip-flops 181, 183 or 185 as hereinafter described. It will be noted that in the preferred embodiment, the NAND gate 142, connected to the signal input 55(A) of the decode logic 57, is always the first input NAND gate of the decode logic to be activated upon entry of a unique operator input code. Activation of the NAND gate 142 consists of applying a logical high input signal to the signal input 55(A) of the decode logic 57 by means of the selector button 47-2.

By way of example, entrance of a unique operator input code associated with the "low" maximum speed (47-2, 47-1, 47-0, 47-7 and 47-4), causes the following sequential activation within the decode logic 57. Application of a logical high signal to the input 142(a) of the NAND gate 142 along with the logical high already appearing at its second input 142(b), causes its output 142(c) to switch to a logical low level. When the NAND gate 142 switches, the negative going edge of the logical low pulse at its output triggers the first timer 144 into its quasi-stable state. It will be noted that all of the one-shot timers of the preferred embodiment are triggered by negative going pulses. The first timer 144 is maintained operative in its quasi-stable state for 0.5 seconds in the preferred embodiment, causing a logical high to appear at its output 145 during that time interval. Since the signal output 145 of the first timer 144 directly drives the first input 148(a) of the NAND gate 148, the NAND gate 148 is enabled for activation during that 0.5 second time interval in which the first timer 145 is operative in its quasi-stable state. Therefore, if the 47-1 selector button is sequentially activated within 0.5 seconds, causing a logical high to be applied to the signal input 55(B) of the decode logic 57 and to the input 148(b) input of the NAND gate 148, the NAND gate 148 will switch, producing a logical low level at its output 148(c).

In like manner, the logical low from the gate 148 will trigger the second timer 150 into its quasi-stable state for a 0.5 second time interval, permitting the NAND gates 154 and 156 to be enabled during that time interval. If the 47-0 selector button is depressed within the next succeeding 0.5 second interval, the NAND gate 154 will be enabled, and will provide a logical high set signal by means of the inverter 180 to the set input 181(S) of the low-speed flip-flop 181. Upon receiving the set signal, the outputs 181(Q) and 181($\overline{Q}$) of the low-speed flip-flop 181 will respectively attain logical high and logical low levels. The logical high appearing at the 181(Q) output of the flip-flop 181 will cause the output 161(c) of the NOR gate 161 to attain a logical low level, which when inverted by the inverter 162 is applied to the first input 164(a) of the NAND gate 164. Therefore, the NAND gate 164 will be enabled upon receipt of a logical high signal at its second signal input 164(b).

In a manner similar to that previously described, the successive sequential depression of selector button 47-7 will cause a logical high signal to be applied to the input 55(E) of the decode logic 57, enabling the NAND gate 164, causing its output 164(c) to drop to a logical low level which activates the fourth timer 168. The fourth timer becomes operative in its quasi-stable state for 0.5 seconds, causing a logical high to appear at its output 169. The fourth timer, when operative in its quasi-stable state provides a logical high to the first signal input 174(a) of the NAND gate 174 by means of the NOR gate 171 and the inverter 172.

The successive sequential activation of the 47-4 selector button within the 0.5 second quasi-stable state of the fourth timer 168 will enable the NAND gate 174 by means of the signal input 55(G), causing the signal output 174(c) of the NAND gate 174 to switch to a logical low. The logical low signal output of the NAND gate 174, when inverted by the inverter 184 provides a logical high set input to the high speed flip-flop 185, causing its 185($\overline{Q}$) signal output to attain a logical high.

Therefore, if the preceding five input selections of the above example have been successively made in a timely manner (i.e. each selection within 0.5 seconds of the immediately preceding selection) an input code corresponding to a predetermined "low-speed" setting will have been properly entered into the system, and the decode logic 57 will have recognized that input code as one of the predetermined low-speed unique input codes. Under such conditions, the low-speed flip-flop 181 and the high-speed flip-flop 185 are both in a "set" state with their Q outputs at logical high levels and their $\overline{Q}$ outputs at logical low levels. The medium-speed flip-flop 183 is still in its normal "reset" state with its Q output at a logical low and its $\overline{Q}$ output at a logical high.

The logical level applied to the signal input 60 of the decode logic 57 normally appears at a logical low. Therefore, when a low-speed unique operator input code has been properly received, the signal outputs 190(e) and 191(d) of the NOR gates 190 and 191 will appear at logical low levels, and the signal output 192(d) of the NOR gate 192 will appear at a logical high. When a proper input code has been entered into the system and decoded by the decode logic 57, one of the NOR gates 190, 191 or 192 will have a signal output appearing at a logical high level, causing the signal output 193(d) of the NOR gate 193 to appear at a logical low. This signal, made available to the rest of the system by means of the signal output 62 of the decode logic 57, provides an indication to the system that a unique operator input code has been recognized by the system. The individual signals provided by the NOR gates 190, 191 and 192 to the signal outputs 61(a), 61(b) and 61(c), respectively provide an indication to the rest of the system of the particular maximum speed level which is currently recognized by the system as a result of a properly entered unique operator input code.

Once a unique operator input code has been properly entered, the logical low appearing at the output 193(d) of the NOR gate 193, and fed back to the second signal output 142(b) of the NAND gate 142, prevents a successive entry by an operator of the motor vehicle of a different operator code. This results from the fact that for the particular programming of the encoded program card 52 illustrated in FIG. 3, all unique operator input codes begin with and require depression of the 47-2 selector button. An operator, therefore, cannot activate the system and the engine of the motor vehicle by entering that unique operator input code known to him, and subsequently attempt to reset the system to recognize a higher speed unless the engine is completely deenergized and the entire system is reset.

The decode logic 57 may be analyzed in similar manner for entrance by an operator of an input code corresponding to the predetermined medium and high speeds. When a unique operator input code corresponding to the medium speed is properly entered in a timely manner, the signal inputs 55(A), 55(B), 55(D), 55(F) and 55(G) will be sequentially activated. In summary, the NAND gate 142 when enabled will activate the first timer 144, allowing the NAND gate 148 to be enabled. The NAND gate 148 when enabled will activate the second timer 150, allowing the NAND gate 156 to be enabled. The NAND gate 156 when enabled will activate the third timer 158 which will allow the NAND gate 176 to be enabled. The NAND gate 176 when enabled will set the medium speed flip-flop 183 by means of the inverter 182 and the set input 183(S) of the flip-flop 183.

When operative in its set state, the Q output of flip-flop 183 provides a logical high signal to the first input 174(a) of the NAND gate 174 by means of the NOR gate 171 and the inverter 172. The NAND gate 174 when subsequently enabled, provides a set input to the high speed flip-flop 185 by means of the inverter 184.

Therefore, when a unique operator input code corresponding to a predetermined medium speed has been properly entered, the low speed flip-flop 181 is operative in its normal reset state, and the medium speed flip-flop 183 and the high speed flip-flop 185 are operative in their set states. Accordingly, the signal outputs 61(c) and 61(a) appear at logical low levels while the signal output 61(b) appears at a logical high level.

In like manner, when a unique operator input code corresponding to a predetermined "high speed" is entered into the system (sequential activation of the signal inputs 55(A), 55(B), 55(C), 55(E) and 55(G), the following decoding functions occur. The NAND gate 142 when enabled activates the first timer 144 which allows the NAND gate 148 to be enabled. The NAND gate 148 when enabled activates the second timer 150, allowing the NAND gate 156 to be enabled. The NAND gate 156 when enabled activates the third timer 158 which provides a logical high to the first signal input 164(a) of the NAND gate 164 by means of the NOR gate 161 and the inverter 162. The NAND gate 164 when enabled activates the fourth timer 168 which provides a logical level to the first signal input 174(a) of the NAND gate 174 by means of the NOR gate 171 and the inverter 172. The NAND gate 174 when enabled provides a logical high set signal to the high speed flip-flop 185 by means of the inverter 184. Therefore, when a unique operator input code corresponding to a predetermined high speed has been properly entered into the electronic speed control unit 10, only the high speed flip-flop 185 is in a set state; the low speed flip-flop 181 and the medium speed flip-flop 183 are operative in their normally reset states. Accordingly, the signal output 61(a) of the decode logic appears at a logical high while the signal outputs 61(b) and 61(c) appear at logical low levels.

In summary, whenever one of the unique operator input codes has been properly entered in a timely manner, the decode logic 57 provides a logical high signal at one of its signal outputs 61(a), 61(b) or 61(c) indicative of the predetermined maximum speed associated with that unique operator input code. In particular, a logical high appearing at the signal output 61(c) indicates a properly entered low speed operator input code; a logical high appearing at the signal output 61(b), indicates a properly entered medium speed operator input code; and a logical high appearing at the signal output 61(a) indicates a properly entered high speed unique operator input code. It is elementary, that additional speed increments can be attained by the addition of appropriate decoding logic, and, for the type of circuit arrangement illustrated in FIG. 3, by the addition of flip-flops corresponding to the required speeds and output NOR gates similar to the 190, 191 and 192 gates.

The NOR gates 147, 153, 155, 165, 175 and 177 operatively sense simultaneous activation of any two input code selector buttons 47. Each of these NOR gates is enabled only when two of the input selector buttons are simultaneously depressed. For example, the NOR gate 147 is activated when the 47-2 and the 47-1 selector buttons are simultaneously depressed. These first stage NOR gates provide direct inputs to the NOR gate 195 by means of the plurality of inputs X1 through X6, and cause its output 196 to switch to a logical low upon enabling of any one of the first stage NOR gates. In such event, the negative going signal provided at the output 196 of the NOR gate 195 activates the fifth timer 198, which provides a logical high signal at its output 199 for a 5 minute time interval in the preferred embodiment. A logical high level at the signal output 199 of the fifth timer 198 provides a reset signal to the first input 203(a) of the NAND gate 203, resetting all three of the flip-flops 181, 183 and 185. The thus reset flip-flops cause all of the signal outputs 61 to appear as logical low levels, deenergizing the control circuits 83 portion of the system as hereinafter described for the duration of that five minute time interval.

Referring to FIGS. 2-4, in the absence of a properly entered unique operator input code, the FETS 211, 215, 217 and 219 are biased in their non-conductive modes due to the logical low levels applied to their gates. When one of the signal outputs 61(a)-61(c) appears at a logical high or when the 61(d) output attains a logical high as hereinafter described, one of the four FETS will be switched into its conductive mode by means of that logical high applied to its gate through the proper input terminal 66(a) through 66(d). The FET which is selectively switched into its conductive mode, causes the resistor connected to its drain to be connected, in cooperation with the capacitor 212, to the signal output 70 of the speed select switching block 67. For example, if a unique operator input code corresponding to the predetermined high speed has been properly entered, a logical high will appear at the output 61(a) causing the FET 211 to become operative in its conductive mode, and operatively connecting resistor 210 and capacitor 212 to the signal output 70 of the speed select logic 67. That particular resistor/capacitor combination operatively connected with the signal output 70 of the speed select logic 67 provides the timing bias circuit for the sixth timer 251 of the control circuits 83 and determines the duration of the quasi-stable activation of the sixth timer.

Additional timing elements may be introduced to the sixth timer 251 by means of the circuits associated with the NPN transistors 222 and 226. The transistors 222 and 226 are normally biased in cutoff by means of logical low levels appearing at the signal inputs 12 and 13 of the electronic speed control unit 10. Whenever the windshield wiper switch 32 is activated, a logical high will appear at the signal input 12 of the speed control unit 10, driving transistor 222 into saturation and operatively connecting the capacitor 223 connected to its collector in parallel with the capacitor 212. The parallel connection of the capacitors 212 and 223 provides an increase in that capacitance seen at the signal output 70 of the speed select switching block 67. Similarly, when the external light switch 33 of the motor vehicle is activated, a logical high is applied to the signal input 13 of the speed control unit 10 driving the transistor 226 into saturation and operatively connecting the capacitor 227 in parallel with the capacitor 212. In the event that both the wiper and light switches 32 and 33 respectively are activated, all three of the capacitors 212, 223 and 227 will be operatively connected in parallel. As will be described in more detail herein, an increase in effective capacitance reflected to the signal output 70 of the speed select switching block causes the sixth timer 251 to produce wider pulses and effectively reduces the maximum speed limit allowed by the speed control unit 10. Also, those FETS associated with lower speeds will reflect an RC time constant to the sixth timer 251 which will cause it to produce wider pulses than it would as a result of the reflected RC time constants of the higher speed associated FETS.

The control circuits 83 represent the decision making circuits of the electronic speed control unit 10. Based upon the selected timing input from the speed select switching unit 67, and the signal input from the speed sensor 75, to be hereinafter described, the control circuits 83 control the flow of current to the ignition coil 36 of the motor vehicle.

In general, the NOR gate 305 of the control circuits 83 controls the energization of the interrupt drive circuits 97. The signal output 305(d) of the NOR gate 305 will appear at a logical high, thus enabling the interrupt drive circuits 97 to energize the ignition coil 36, whenever all of its signal inputs appear at logical low levels. The first signal input 305(a) of the NOR gate 305 is normally at a logical low level when the actual speed of the vehicle has not exceeded the predetermined selected maximum speed as hereinafter described. The second signal input 305(b) of the NOR gate 305, connected to the signal output 62 of the decode 57 by means of the inverter 306 and NOR gate 307, appears at a logical low whenever the signal level appearing at the output 62 of the decode logic 57 appears at a logical low; this occurs whenever the decode logic 57 has recognized proper entry of one of the unique operator input codes, as previously described. The third signal input 305(c) of the NOR gate 305 normally appears at a logical low level whenever the vehicle is not experiencing excessive acceleration as hereinafter described with respect to the acceleration control circuit 94.

The signal output 305(d) of the NOR gate 305 will switch to a logical low, causing the interrupt drive circuits 97 to de-energize the ignition coil 36 upon receiving a logical high level at any one of its three inputs. A logical high is provided at its second input 305(b) whenever the decode logic 57 has not recognized proper entry of one of the unique operator input codes. Under such conditions, output 62 of the decode logic will appear at a logical high, as previously described, causing a logical low to be applied to the first input 307(a) of the NOR gate 307. The normally low signals appearing at the outputs of the seventh and eighth timers 270 and 280 respectively will cause a logical low to be applied to the second input 307(b) of the NOR gate 307. Therefore the output 307(d) of the NOR gate 307 will appear at a logical high.

A logical high is applied to the third signal input 305(c) of the NOR gate 305 whenever the acceleration control circuit 94, to be hereinafter described, senses excessive acceleration of the motor vehicle.

A logical high is applied to the first signal input 305(a) of the NOR gate 305 whenever the ninth timer 301 is operable in its quasi-stable state. The timer 301 is triggered into quasi-stable operation whenever the output 290(c) switches from its normal logical high level to a logical low; this occurs whenever an overspeed indication is provided by the control circuits 83 as below described.

Referring to FIG. 4, the sixth timer 251 of the control circuits 83 receives input information from both the speed select switching block 67 and the speed sensor block 75 by means of the signal inputs 84 and 81 respectively. The speed sensor network 75 is generally operative to provide a pulse train signal having a pulse repetition rate proportional to the moving velocity of a motor vehicle. The disc 320 is connected with a speedometer 30 of the motor vehicle for rotation with a rotatable speed monitor thereof. The light emitting diode 325 is biased in its light emitting state whenever the ignition switch 27 closes the circuit from the battery 20. The photosensitive transistor 327 is insulated from receiving any light that would cause it to operatively respond thereto except that light emitted by the LED 325 which impinges on the transistor 327 through the apertures 321 of the disc 320 as the disc rotates. Therefore, the photosensitive transistor 327 will conduct during those time periods in which it receives light from the LED 325 and will not conduct during those time intervals when the light from the LED is obstructed by the solid portions of the disc 320. When the phototransistor 327 is operatively conducting, the transistor 333 will also be biased into conduction causing a logical low to appear at its collector 333(c) and also at the signal output 79 of the speed sensor 75.

Conversely, when the photosensitive transistor 327 is not operatively conducting, the transistor 333 will be biased into cutoff, causing a logical high to appear at its collector 333(c) and also at the output 79 of the speed sensor 75. Consequently, as the disc 320 rotates with rotatable member of the speedometer 30, a pulse train signal is generated at the signal output 79 of the speed sensor 75. In the preferred embodiment, the duty cycle of the generated pulse train signal is approximately 50 percent, however, this is not essential to the operation of the invention. What is important, is that the frequency of the pulse train signal appearing at the signal output 79 of the speed sensor 75 is proportional to the actual speed of the motor vehicle, and that the constant of proportionality thereof is known.

The pulse train signal from the speed sensor 75 is applied to the signal input 252 of the sixth timer 251 by means of the capacitor 254. Since the timer 251 is a one-shot multivibrator, as previously described, it is triggered into its quasi-stable mode of operation on each negative going pulse edge of the pulse train signal received from the speed sensor 75. As previously discussed, the time duration at which the timer 251 will remain in its quasi-stable state of operation is determined by the particular values of the RC timing elements of the speed select switching block 67 which are connected to the timing inputs 250 of the timer 251. Therefore, the output signal appearing at the signal output 253 of the timer 251 is a pulse train signal having constant pulses of selectably predetermined width, that predetermined width being determined by the specific switching arrangement of the speed select switching block 67. The frequency of the pulse train signal occurring at the signal output 253 of the timer 251 is proportional to the frequency of the pulse train signal from the speed sensor 75 and is therefore also proportional to the actual speed of the motor vehicle.

The timing constants of the various switching elements of the speed select switching block 67 are selected in cooperation with the speed sensor network 75 such that at the desired maximum speed limit, the duty cycle of the pulse train signal appearing at the signal output 253 of the timer 251 will be 50 percent. For example, if a unique operator input code is properly entered into the speed control unit such that the low maximum speed circuitry is activated (i.e., a logical high appears at the signal output 61(c) of the decode logic 57) the FET 217 of the speed select switching block 67 will be biased into conduction, operatively connecting the resistor 216 and the capacitor 212 as the selected timing elements to the timing input 250 of the timer 251. The values of the resistor 216 and the capacitor 212 are such that when the motor vehicle attains the predetermined low maximum speed (for example fifty miles per hour), the pulse train signal appearing at the signal output 253 of the timer 251 will have a 50 percent duty cycle. As the speed of the motor vehicle exceeds the predetermined low maximum speed limit, the duty cycle of the pulse train signal appearing at the signal output 253 of the timer 251 will exceed 50 percent.

The pulse train signal from the timer 251 is applied by means of the resistor 257 to the inverting input 258(I) of the operational amplifier 258. A DC level determined by the resistor divider network 262 and 261 is applied to the non-inverting input 258(NI) of the amplifier 258. The level applied to the non-inverting input 258(NI) of the amplifier 258 is selected to equal the average DC level of the pulse train signal applied to the inverting input 258(I) of the amplifier 258 at the preselected maximum speed limit of the motor vehicle (as activated by a properly entered unique operator input code). For example, if the decode logic 57 has recognized a unique operator input code associated with the maximum "low" speed, the average DC level of the pulse train signal applied to the inverting input 258(I) of the amplifier 258 will equal that constant DC level applied to the amplifier's non-inverting input when the vehicle attains the maximum "low" speed limit. The resistor 257 further provides as a means for adjusting the average DC level of the pulse train signal provided by the timer 251, but does not affect the duty cycle of frequency of the pulse train signal.

The signal output 259 of the operational amplifier 258 will remain at a normally logical high level until the average DC level applied to the inverting input of the amplifier equals or exceeds that constant DC level applied to its non-inverting input. Therefore, as long as the actual moving velocity of the vehicle does not exceed the predetermined maximum speed limit as selected, the transistor 294 will be biased into saturation, causing a logical high level to appear at the second signal input 290(b) of the OR gate 290.

The operational amplifier 258, therefore, performs the over-speed sensing function of the control circuits 83. When the amplifier 258 is triggered so as to provide a logical low at its output 259, the transistor 294 is driven into cutoff, providing a logical low input signal to the second input 290(b) of the OR gate 290. However, before the OR gate 290 will switch, causing deenergization of the ignition coil 36, its first input 290(a) must also appear at a logical low.

As the output 259 of the amplifier 258 switches to a logical low, a negative going pulse is fed through the capacitor 264 to the base 265(b) of transistor 265, causing the transistor 265 to momentarily become operative in its cutoff region. As a result, a positive going pulse signal appears at the collector 265(c) of transistor 265, causing a negative going pulse to appear at the input 269 of the seventh timer 270 and causing the timer 270 to become operative in its quasi-stable state (also referred to as the "passing mode") for a 20 second period. When operative in its quasi-stable state, the timer 270 provides a logical high level to the first signal input 275(a) of the NAND gate 275. The second signal input 275(b) of the NAND gate 275 also normally appears at a logical high. Therefore, the logical high applied by the timer 270 to the first signal input 275(a) of the gate enables the gate and causes a logical high signal to appear at the signal output 87 of the control circuits 83.

Referring to FIGS. 2 and 3, the logical high at the signal output 87 of the control circuits 83 is directly applied to the signal input 60 of the decode logic 57 and overrides the flip-flops 181, 183 and 185 by providing a logical high signal input to each of the NOR gates 190, 191 and 192, causing logical low signals to appear at the outputs 61(a), 61(b) and 61(c), while providing a logical high gating signal to the FET 219 by means of the signal output 61(d) of the decode logic 57 and the signal input 66(d) of the speed select switching block 67. The logical high at the gates of FET 219, drives the FET 219 into conduction, thus operatively connecting the resistor 218 and the capacitor 212 to the signal output 70 of the speed select switching block 67. The effective RC time constant reflected to the timer 251 is greater for a connection of the resistor 218 with the capacitor 212 than for any of the other timing resistors (210, 214 or 216) thereby causing a narrower pulse width within the pulse train signal appearing at the signal output 253 of the timer 251. The narrower pulse widths thus created, provide a lower average DC signal to the inverting input 258(I) of the amplifier 258, causing the output 259 of the amplifier 258 to revert to a logical high.

The logical high thus appearing at the base 265(b) of the transistor 265 drives the transistor 265 into saturation, causing a logical high to appear at the signal input 269 of the timer 270. Therefore, upon completion of its 20 second timeout, the timer 270 will revert back to its stable state, causing a logical low to reappear at its signal output 271 and re-establishing the programmed maximum speed limit of the system by removing its inhibiting signal upon the NOR gates 190, 191 and 192. However, until the timer 270 has completed its initial 20 second time-out, the FET 219 operatively conducts at the exclusion of the FETS 211, 215 and 217, and the input 290(b) will revert to a logical high, thus insuring energization of the ignition coil 36. The effect of the above is that an operator of the motor vehicle may exceed his programmed predetermined maximum speed limit for a predetermined period of time, as determined by the time-out period of the seventh timer 270. In the preferred embodiment, that time-out period has been set at 20 seconds.

However, the frequency at which an operator may exceed his programmed maximum speed limit, is limited by the operation of the eighth timer 280, as described below. Upon completion of its twenty second time-out, the seventh timer 270 will revert to a stable state, causing a logical low to appear at its signal output 271. Note that prior to this time, the signal input 279 of the eighth timer 280 has been maintained at a logical high. However, upon switching of the seventh timer 270 from a quasi-stable to a stable state, the signal input 279 of the eighth timer 280 effectively sees a negative going triggering pulse caused by current flow through the resistor 286 and the diode 284. This negative triggering pulse causes the eighth timer 280 to become operative in its quasi-stable state, in the preferred embodiment, for a period of 10 minutes, and causes a logical low to appear at the second signal input 275(b) of the NAND gate 275. As a result, the passing mode previously described is disabled for the 10 minute time interval in which the eighth timer 280 is active in a quasi-stable state.

While operative in its quasi-stable state, the eighth timer 280 also provides a logical low to the signal input 290(a) of the OR gate 290. Therefore, if an operator of the motor vehicle exceeds his pre-programmed maximum speed limit within that 10 minute time interval in which the eighth timer 280 is operative in a quasi-stable state, the seventh timer 270 will also become operative in its quasi-stable state as previously described, but its effect will be negated by the logical low applied to the second input 275(b) of the NAND gate 275. Simultaneously, the logical low appearing at the output 259 of the amplifier 258 will cause the transistor 294 to become operative in its cutoff mode, causing a logical low to appear at the second signal input 290(b) of the OR gate 290 and triggering the ninth timer 301 into quasi-stable operation. The logical high appearing at the signal output 302 of the ninth timer 301 will enable the NOR gate 305, causing a logical low to appear at the signal output 86 of the control circuits, for causing the interrupt drive circuits 97 to deenergize the ignition coil 36 of the motor vehicle, as previously described.

Therefore, with that portion of the electronic speed control unit 10 above described, an operator can exceed his preprogrammed maximum speed limit for a 20 second time duration for emergency passing situations, but will be prevented from reactivating this passing mode for a succeeding 10 minute time interval. During that 10 minute time interval, any attempt by the operator to exceed his pre-programmed maximum speed limit will result in a deenergization of the engine of his motor vehicle. It will be recognized that the above time durations may be varied from those employed by the preferred embodiment without departing from the spirit or intent of this invention.

The transistors 222 and 226 of the speed select switching block 67 provide additional timing circuits for increasing the width of pulses within the pulse train signal at the output 253 of the sixth timer 251 whenever the external light switch 33 or the windshield wiper switch 32 (FIG. 2) of the motor vehicle are energized. The effect of gating either of the transistors 222 or 226 into saturation operatively connects their respective capacitors 223 and 227 to the signal output 70 of the speed select switching block 67 and reduces the selected predetermined maximum speed limit of the vehicle as long as the wiper or external light switch remains activated. The amount of speed reduction is determined by the value of the capacitors 223 and 227 connected in parallel with the capacitor 212.

An optional feature of the electronic speed control unit 10 is provided by addition of the acceleration control circuit 94 (FIG. 6) to the control circuits 83. The acceleration control circuit 94 is simply added to the control circuits 83 by removing the jumper wire 256 (FIG. 4) near the output of the sixth timer 251, by connecting the appropriate terminals 256(a) and 256(b) of the acceleration control circuit 94 therebetween and by connecting the signal output of the acceleration control circuit to the third signal input 305(c) of the NOR gate 305.

The acceleration control circuit 94 is generally operative to provide a logical high input signal to the third signal input 305(c) of the NOR gate 305 whenever a predetermined maximum acceleration of the motor vehicle is exceeded. In particular, the capacitors 393 and 391 of the acceleration control circuit 94 are charged to the average DC value of the pulse train signal appearing at the signal output 243 of the sixth timer 251. Due to the resistor 387, the capacitor 393 will charge at a faster rate than the capacitor 391.

If the vehicle's acceleration exceeds the predetermined maximum acceleraion rate, the charging voltage at the junction of the capacitor 393 and the resistor 397 will be significantly higher than the charging voltage for the capacitor 391 to cause a voltage difference between the inverting and non-inverting inputs of the amplifier 380 sufficient to cause the amplifier 380 to switch its operative states. The normally logical high appearing at the signal output 393 of the amplifier 380 will switch to a logical low, thus providing a logical high to the third signal input 305(c) of the NOR gate 305 by means of the inverter 395. The interrupt drive circuits 97 will thereupon deactivate the ignition coil 36 of the motor vehicle. Upon deceleration of the vehicle, the capacitor 391 will discharge to an equilibrium value through the diode 386, causing the output 383 of the amplifier 380 to revert to its normal logical high level, and enabling the interrupt drive circuits to re-energize the ignition coil 36.

While we have disclosed a specific embodiment of our invention, it is to be understood that this is for the purpose of illustration only, and that our invention is to be limited solely by the scope of the appended claims.

What is claimed is:

1. An improved speed control apparatus for motor vehicles, comprising:
   a. means for sensing the speed of a motor vehicle and for providing a sensed speed signal indicative thereof;
   b. a single self-contained input means operable by an operator of the motor vehicle for receiving a plurality of operator input codes, each of said codes comprising a sequence of a plurality of code elements;
   c. means operatively connected with said input means for selectively providing a plurality of maximum output speed signals in response to unique ones of said received operator input codes, wherein each of said produced maximum output speed signals is capable of being operatively responsive to more than one of said unique ones of said operator input codes; and
   d. engine control means operatively connected to receive said sensed and said maximum speed signals for controlling the speed of the motor vehicle in response thereto.

2. An improved speed control apparatus for motor vehicles according to claim 1, including means operatively connected with said engine control means for preventing energization of an engine of the motor vehicle until one of said unique operator input codes has been received by said input means.

3. An improved speed control apparatus for motor vehicles according to claim 1, wherein said input means includes a selector panel having a plurality of code selectors forming an integral part thereof each associated with one of said code elements, said selector panel being operable to generate all of said plurality of input codes upon sequential selective activation of said code selectors by an operator of the motor vehicle.

4. An improved speed control apparatus for motor vehicles according to claim 3, including means operatively connected with said input means and with said means for providing said maximum output speed signals for restricting operative activation of those ones of said code selectors which correspond to successive code elements of said unique operator input codes, according to a predetermined timing schedule.

5. An improved speed control apparatus for motor vehicles according to claim 3, wherein said plurality of code elements are digitally representable, and wherein said plurality of code selectors of the selector panel comprise a plurality of digitally designated selector switches.

6. An improved speed control apparatus for motor vehicles according to claim 1, wherein said means for providing said maximum speed signals includes means for producing a selected one of said plurality of predetermined maximum output speed signals in response to each of said unique received operator input codes, and wherein said speed control apparatus further includes means for sensing the complete receipt of a first unique operator input code and for thereafter preventing successive operative receipt of a second unique operator input code until recycling of the apparatus.

7. An improved speed control apparatus for motor vehicles according to claim 1, further including acceleration control means operatively connected with said engine control means and connected to receive said sensed speed signal for preventing in response thereto acceleration of the motor vehicle in excess of a predetermined acceleration rate.

8. An electronic maximum speed limiting apparatus for motor vehicles, comprising:
   a. a single, self-contained input selector means for receiving a plurality of different operator input codes, wherein each of said input codes comprises a sequence of a plurality of code elements;
   b. decode circuit means connected to receive said plurality of operator input codes for selectively producing maximum speed limit output signals in response to unique ones of said operator input codes;
   c. programmable encoding means operatively connecting said input selector means with said decode circuit means, and normally inaccessible to an operator of the motor vehicle, for programmably defining said unique ones of said operator input codes;

d. speed sensing means for producing a speed signal indicative of the velocity of the vehicle;

e. means operatively connected with said speed sensing means and with said decode circuit means for altering said speed signal in response to the selectively produced maximum speed limit output signal; and f. control means operatively connected to receive said altered speed signal for controlling energization of an engine of the motor vehicle in response thereto.

9. An electronic speed limiting apparatus for motor vehicles according to claim 8, further including means for producing a reference signal, wherein said speed signal comprises a pulse train having frequency proportional to the speed of the vehicle, wherein said means for altering said speed signal comprises means for varying the width of pulses of said pulse train in response to the selectively produced maximum speed limit signal, and wherein said control means is connected to receive said reference signal and includes means for comparing said altered speed signal with said reference signal for controlling energization of the engine in response thereto.

10. An electronic maximum speed limiting apparatus for motor vehicles according to claim 8, wherein said maximum speed limit output signals are identifiable with predetermined maximum speed limits of the motor vehicle, and wherein said control means includes means for comparing said altered speed signal with a reference signal for limiting the maximum speed of the motor vehicle to that predetermined speed associated with the selectively produced maximum speed signal.

11. An electronic maximum speed limiting apparatus for motor vehicles according to claim 10, further including passing override means operatively connected with said control means for enabling the control means to energize said engine for a predetermined time interval following an over-speed indication by said comparator means.

12. An electronic maximum speed limiting apparatus for motor vehicles according to claim 11, including means operatively connected with said passing override means for preventing operative activation thereof for a predetermined time interval following its last activation.

13. A programmable maximum speed limting apparatus for motor vehicles, comprising:

a. speed sensing means for producing a sensed speed signal indicative of the speed of the motor vehicle;

b. a single code input selector means for receiving a plurality of operator entered input codes, wherein each of said input codes comprises a sequence of a plurality of code elements;

c. programmable encoding means, operatively connected with said code input means and normally inaccessible to an operator of the motor vehicle, for providing a plurality of encoded signals in response to unique ones of said plurality of received operator input codes, said encoding means being programmably alterable to recognize different unique ones of said operator input codes;

d. decode circuit means operatively connected to receive said encoded signals for selectively producing in response thereto a maximum speed limit signal identifiable with a predetermined maximum speed limit of the vehicle; and e. engine control means operatively connected with an engine of the motor vehicle and connected to receive said sensed speed and said maximum speed limit signals for controlling energization of said engine in response thereto, said control means being operative to deenergize said engine whenever the sensed speed signal indicates a vehicle speed in excess of that predetermined maximum speed limit identified with the maximum speed limit signal received by said engine control means.

14. A programmable maximum speed limiting apparatus for motor vehicles according to claim 13, wherein said code input selector means comprises a keyboard-type selector panel having a plurality of selector switching means each associated with one of said code elements and wherein each of said received input codes comprises the composite electrical signal produced by a given sequential activation of said plurality of selector switching means.

15. A programmable maximum speed limiting apparatus for motor vehicles according to claim 14, including means connected with said code input selector means and with said control means for sensing simultaneous activation of more than one of said plurality of selector switching means and for causing said control means to prevent energization of said engine for a predetermined time interval after such simultaneous activation.

16. A programmable maximum speed limiting apparatus for motor vehicles according to claim 13, wherein said sensed speed signal comprises a pulse train signal having frequency proportional to the speed of the vehicle, wherein said decode circuit means includes means for selectively producing one of a plurality of predetermined maximum speed limit signals in response to each received unique operator input code, and wherein said engine control means comprises:

a. means for varying the width of pulses of said pulse train signal in response to said selectively produced maximum speed limit signal;

b. means for producing a dc reference signal; and c. comparator means for comparing said varied pulse train signal with said reference signal for deenergizing the engine in response thereto.

17. A programmable maximum speed limiting apparatus for motor vehicles according to claim 13, wherein said sensed speed signal comprises a pulse train signal having frequency proportional to the speed of the vehicle, and further includes acceleration control means operatively connected to receive said sensed speed signal for measuring the time rate of change of said speed signal and for deenergizing said engine whenever the time rate of change of said speed signal exceeds a predetermined rate.

18. The method of setting the maximum speed limit into a speed limiter apparatus for motor vehicles comprising the steps of:

a. pre-programming the speed limiter to recognize a plurality of unique operator input codes, wherein each of the input codes comprises a sequence of a plurality of code elements;

b. sequentially entering the code elements of one of the unique operator input codes into the speed limiter;

c. decoding the entered operator input code to selectively produce one of a plurality of predetermined maximum speed limit signals in response thereto; and d. automatically setting the maximum speed limit of the vehicle in response to the selected predetermined maximum speed limit signal.

19. The method of setting the maximum speed limit into a speed limiter apparatus according to claim 18, further including the step of providing recognition only of those unique entered input codes wherein each individual code element after the first of such elements of each unique code is sequentially entered into the speed limiter within a predetermined time interval of the immediately preceding code element.

20. The method of limiting the maximum speed of a motor vehicle having a speed control apparatus thereon, comprising the steps of:

a. producing a pulse train signal having frequency proportional to the speed of the motor vehicle;

b. causing the width of pulses of the pulse train signal to vary in response to a maximum speed limit signal;

c. selectively providing said maximum speed limit signal from a plurality of predetermined ones of such signals;

d. producing a dc reference signal; and e. comparing said pulse train and said reference signals for producing a speed control signal in response thereto.

* * * * *